US012718438B2

(12) United States Patent
Li et al.

(10) Patent No.: US 12,718,438 B2
(45) Date of Patent: Aug. 25, 2026

(54) FINE-TUNING DIFFUSION-BASED GENERATIVE NEURAL NETWORKS USING SINGULAR VALUE DECOMPOSITIONS FOR TEXT-TO-IMAGE GENERATION

(71) Applicant: Google LLC, Mountain View, CA (US)

(72) Inventors: Yinxiao Li, Sunnyvale, CA (US); Ligong Han, Edison, NJ (US); Han Zhang, Sunnyvale, CA (US); Peyman Milanfar, Menlo Park, CA (US); Feng Yang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 18/853,974

(22) PCT Filed: Mar. 13, 2024

(86) PCT No.: PCT/US2024/019726
§ 371 (c)(1),
(2) Date: Oct. 3, 2024

(87) PCT Pub. No.: WO2024/196665
PCT Pub. Date: Sep. 26, 2024

(65) Prior Publication Data
US 2025/0225700 A1 Jul. 10, 2025

Related U.S. Application Data

(60) Provisional application No. 63/453,030, filed on Mar. 17, 2023.

(51) Int. Cl.
*G06T 11/00* (2026.01)
*G06T 5/20* (2006.01)
(Continued)

(52) U.S. Cl.
CPC ................ *G06T 11/60* (2013.01); *G06T 5/20* (2013.01); *G06T 5/60* (2024.01); *G06T 5/70* (2024.01);
(Continued)

(58) Field of Classification Search
None
See application file for complete search history.

(56) References Cited

U.S. PATENT DOCUMENTS

2019/0213772 A1* 7/2019 Lombardi ............... G06T 17/20
2020/0066261 A1* 2/2020 Ganz ....................... G06F 40/30
(Continued)

OTHER PUBLICATIONS

International Preliminary Report on Patentability in International Appln. No. PCT/US2024/019726, mailed on Oct. 2, 2025, 9 pages.
(Continued)

*Primary Examiner* — Martin Mushambo
(74) *Attorney, Agent, or Firm* — Fish & Richardson P.C.

(57) ABSTRACT

Methods, systems, and apparatus, including computer programs encoded on a computer storage medium, for fine-tuning diffusion-based generative neural networks in compact parameter spaces for text-to-image generation. In one aspect, a method performed by one or more computers for fine-tuning a diffusion-based generative neural network to obtain a fine-tuned version of the diffusion-based generative neural network is described. The method includes: for each of a number of neural network layers of the diffusion-based generative neural network: obtaining an initial weight matrix including a number of pre-trained weights parametrizing the neural network layer: performing a singular value decomposition on the initial weight matrix; and re-parametrizing the neural network layer with new weights that depend on spectral sifts; and training the spectral shifts of each of the number of neural network layers of the diffusion-based
(Continued)

generative neural network to obtain the fine-tuned version of the diffusion-based generative neural network.

20 Claims, 11 Drawing Sheets

(51) Int. Cl.
*G06T 5/60* (2024.01)
*G06T 5/70* (2024.01)
*G06T 11/60* (2006.01)

(52) U.S. Cl.
CPC .............. *G06T 2207/20081* (2013.01); *G06T 2207/20084* (2013.01)

(56) References Cited

U.S. PATENT DOCUMENTS

2020/0334502 A1* 10/2020 Tu .......................... G06V 10/82
2023/0081171 A1* 3/2023 Zhang ..................... G06T 11/00 382/157
2023/0118966 A1* 4/2023 Liu ......................... G06F 40/30 345/473
2024/0169623 A1* 5/2024 Zeng ....................... G06T 11/60

OTHER PUBLICATIONS

Avrahami et al., “Blended Diffusion for Text-driven Editing of Natural Images,” Paper, Presented at the IEEE/CVF Conference on Computer Vision and Pattern Recognition (CVPR), New Orleans, LA, Jun. 18-24, 2022, p. 18208-18218 (Author Manuscript).
Avrahami et al., “Blended Latent Diffusion,” CoRR, Submitted on Jun. 6, 2022, arXiv:2206.02779v1, 20 pages.
Balaji et al., “eDiff-I: Text-to-Image Diffusion Models with an Ensemble of Expert Denoisers,” CoRR, Submitted on Nov. 17, 2022, arXiv:2211.01324v4, 24 pages.
Bao et al., “All are Worth Words: A ViT Backbone for Diffusion Models,” Paper, Presented at the IEEE/CVF Conference on Computer Vision and Pattern Recognition (CVPR), Vancouver, Canada, Jun. 17-24, 2023, pp. 22669-22679 (Author Manuscript).
Bao et al., “One transformer fits all distributions in multi-modal diffusion at scale,” CoRR, Submitted on May 30, 2023, arXiv:2303.06555v2, 26 pages.
Bau et al., “Rewriting a Deep Generative Model,” Paper, Presented at Proceedings of the European Conference on Computer Vision, Glasgow, UK, Aug. 23-28, 2020; LNCS, 2020, 123:351-369.
Brack et al., “The Stable Artist: Steering Semantics in Diffusion Latent Space,” CoRR, Submitted on Dec. 30, 2022, arXiv:2212.06013v2, 10 pages.
Brooks et al., “InstructPix2Pix: Learning to Follow Image Editing Instructions,” CoRR, Submitted Nov. 17, 2022, arXiv:2211.09800v1, 15 pages.
Chefer et al., “Attend-and-Excite: Attention-Based Semantic Guidance for Text-to-Image Diffusion Models,” CoRR, Submitted on May 31, 2023, arXiv:2301.13826v2, 24 pages.
Cherepkov et al., “Navigating the GAN Parameter Space for Semantic Image Editing,” Paper, Presented at the IEEE/CVF Conference on Computer Vision and Pattern Recognition (CVPR), Nashville, TN, Jun. 20-25, 2021, pp. 3671-3680 (Author Manuscript).
Feng et al., “Training-Free Structured Diffusion Guidance for Compositional Text-to-Image Synthesis,” CoRR, Submitted on Dec. 9, 2022, arXiv:2212.05032v1, 19 pages.
Gal et al., “An Image is Worth One Word: Personalizing Text-to-Image Generation using Textual Inversion,” CoRR, Submitted on Aug. 2, 2022, arXiv:2208.01618v1, 26 pages.
Gal et al., “Designing an encoder for fast personalization of text-to-image models,” CoRR, Submitted on Feb. 26, 2023, arXiv:2302.12228v2, 11 pages.
Github.com [online], “Diffusers: State-of-the-art diffusion models for image, video, and audio generation in PyTorch and FLAX,” 2022, retrieved on Jun. 20, 2025, retrieved from URL <https://github.com/huggingface/diffusers>, 5 pages.
Github.com [online], “Implementation of Dreambooth with Stable Diffusion,” Sep. 2022, retrieved on Jun. 20, 2025, retrieved from URL <https://github.com/XavierXiao/Dreambooth-Stable-Diffusion>, 5 pages.
Github.com [online], “Low-rank Adaptation for Fast Text-to-Image Diffusion Fine-tuning,” available on or before Mar. 2023, via Internet Archive: Wayback Machine URL <https://web.archive.org/web/20230311020553/https://github.com/cloneofsimo/lora>, retrieved on Jun. 20, 2025, 16 pages.
Github.com [online], “Stable-diffusion,” Dec. 2021, retrieved on Jun. 19, 2025, retrieved from URL <https://github.com/CompVis/stable-diffusion>, 9 pages.
Hertz et al., “Prompt-to-Prompt Image Editing with Cross Attention Control,” CoRR, Submitted on Aug. 2, 2022, arXiv:2208.01626v1, 19 pages.
Ho et al., “Cascaded Diffusion Models for High Fidelity Image Generation,” Journal of Machine Learning Research, Jan. 2022, 23(47):1-33.
Ho et al., “Classifier-Free Diffusion Guidance,” CoRR, Submitted on Jul. 26, 2022, arXiv:2207.12598v1, 14 pages.
Ho et al., “Classifier-free diffusion guidance,” Paper, Presented at the 35th Conference on Neural Information Processing Systems, Virtual Event, Dec. 6-14, 2021; Advances in Neural Information Processing Systems, Dec. 2021, 34:1-8.
Ho et al., “Denoising diffusion probabilistic models,” Paper, Presented at the 34th Conference on Neural Information Processing Systems, Virtual Event, Dec. 6-12, 2020; Advances in Neural Information Processing Systems, Dec. 2020, 33:1-12.
Hu et al., “LoRA: Low-Rank Adaptation of Large Language Models, ” CoRR, Submitted on Oct. 16, 2021, arXiv:2106.09685v2, 26 pages.
Huang et al., “Composer: Creative and Controllable Image Synthesis with Composable Conditions,” CoRR, Submitted on Feb. 22, 2023, arXiv:2302.09778v2, 16 pages.
Ilharco et al., “Editing Models with Task Arithmetic,” CoRR, Submitted on Dec. 8, 2022, arXiv:2212.04089v1, 31 pages.
Iluz et al., “Word-As-Image for Semantic Typography,” CoRR, Submitted on Mar. 6, 2023, arXiv:2303.01818v2, 28 pages.
International Search Report and Written Opinion in International Appln. No. PCT/US2024/019726, mailed on Jul. 10, 2024, 12 pages.
Kawar et al., “Imagic: Text-Based Real Image Editing with Diffusion Models,” CoRR, Submitted on Nov. 22, 2023, arXiv:2210.09276v2, 16 pages.
Kumari et al., “Multi-Concept Customization of Text-to-Image Diffusion,” Paper, Presented at the IEEE/CVF Conference on Computer Vision and Pattern Recognition (CVPR), Vancouver, Canada, Jun. 17-24, 2023, pp. 1931-1941 (Author Manuscript).
Liu et al., “Compositional Visual Generation with Composable Diffusion Models,” Paper, Presented at Proceedings of the European Conference on Computer Vision, Tel Aviv, Israel, Oct. 23-27, 2022; LNCS, 2022, 13677:423-439.
Liu et al., “Cones: Concept neurons in diffusion models for customized generation,” CoRR, Submitted on Mar. 9, 2023, arXiv:2303.05125v1, 17 pages.
Meng et al., “SDEdit: Guided Image Synthesis and Editing with Stochastic Differential Equations,” CoRR, Submitted on Aug. 2, 2021, arXiv:2108.01073v1, 18 pages.
Mo et al., “Freeze the Discriminator: a Simple Baseline for Fine-Tuning GANs,” CoRR, Submitted on Feb. 28, 2020, arXiv:2002.10964v2, 13 pages.
Mokady et al., “Null-text Inversion for Editing Real Images using Guided Diffusion Models,” CoRR, Submitted on Nov. 17, 2022, arXiv:2211.09794v1, 20 pages.
Mturk.com [online], “Amazon Mechanical Turk,” 2005, retrieved on Jun. 19, 2025, retrieved from URL <https://www.mturk.com/>, 5 pages.

(56) References Cited

OTHER PUBLICATIONS

Nichol et al., "GLIDE: Towards Photorealistic Image Generation and Editing with Text-Guided Diffusion Models, " CoRR, Submitted on Dec. 22, 2021, arXiv:2112.10741v2, 20 pages.
Noguchi et al., "Image Generation From Small Datasets via Batch Statistics Adaptation," Paper, Presented at the IEEE/CVF International Conference on Computer Vision (ICCV), Seoul, Korea (South), Oct. 27-Nov. 2, 2019, pp. 2750-2758 (Author Manuscript).
Orgad et al., "Editing Implicit Assumptions in Text-to-Image Diffusion Models," CoRR, Submitted on Aug. 25, 2023, arXiv:2303.08084v2, 19 pages.
Peebles et al., "Scalable diffusion models with transformers," CoRR, Submitted on Dec. 19, 2022, arXiv:2212.09748v1, 24 pages.
Peebles et al., "Scalable Diffusion Models with Transformers," Paper, Presented at the IEEE/CVF International Conference on Computer Vision (ICCV), Paris, France, Oct. 1-6, 2023, pp. 4195-4205 (Author Manuscript).
Poole et al., "DreamFusion: Text-to-3D using 2D Diffusion," CoRR, Submitted on Sep. 29, 2022, arXiv:2209.14988v1, 18 pages.
Radford et al,. "Learning transferable visual models from natural language supervision," Paper, Presented at the International Conference on Machine Learning, Virtual Conference, Jul. 18-24, 2021; PMLR, Apr. 2021, 139:1-16.
Ramesh et al., "Hierarchical Text-Conditional Image Generation with CLIP Latents," CoRR, Submitted on Apr. 13, 2022, arXiv:2204.06125v1, 27 pages.
Rebuffi et al., "Learning multiple visual domains with residual adapters," Paper, Presented at the 31st Conference on Neural Information Processing Systems, Long Beach, CA, Dec. 4-9, 2017; Advances in Neural Information Processing Systems, Dec. 2017, 30:1-11.
Robb et al., "Few-Shot Adaptation of Generative Adversarial Networks," CoRR, Submitted on Oct. 22, 2020, arXiv:2010.11943v1, 10 pages.
Rombach et al., "High-Resolution Image Synthesis with Latent Diffusion Models," Paper, Presented at the IEEE/CVF Conference on Computer Vision and Pattern Recognition (CVPR), New Orleans, LA, Jun. 18-24, 2022, pp. 10684-10695 (Author Manuscript).
Ruiz et al., "DreamBooth: Fine Tuning Text-to-Image Diffusion Models for Subject-Driven Generation," CoRR, Submitted on Aug. 25, 2022, arXiv:2208.12242v1, 21 pages.
Saharia et al., "Photorealistic Text-to-Image Diffusion Models with Deep Language Understanding," CoRR, Submitted on May 23, 2022, arXiv:2205.11487v1, 46 pages.
Shen et al., "Closed-Form Factorization of Latent Semantics in GANs," Paper, Presented at the IEEE/CVF Conference on Computer Vision and Pattern Recognition (CVPR), Nashville, TN, Jun. 20-25, 2021, pp. 1532-1540 (Author Manuscript).
Shin et al., "Edit-A-Video: Single Video Editing with Object-Aware Consistency," CoRR, Submitted on Nov. 17, 2023, arXiv:2303.07945v4, 21 pages.
Shoemake, "Animating Rotation with Quaternion Curves," Paper, Presented at the SIGGRAPH '85: Proceedings of the 12th annual conference on Computer Graphics and Interactive Techniques, San Francisco, CA, Jul. 22-26, 1985, 19(3):245-254.
Sohl-Dickstein et al., "Deep Unsupervised Learning using Nonequilibrium Thermodynamics," Paper, Presented at the Proceedings of the 32nd International Conference on Machine Learning, Lille, France, Jul. 7-9, 2015, 37, 10 pages.
Song et al., "Consistency models," CoRR, Submitted on May 31, 2023, arXiv:2303.01469v2, 42 pages.
Song et al., "Denoising diffusion implicit models," Paper, Presented at Proceedings of the International Conference on Learning Representations, Virtual Event, May 3-7, 2021, 20 pages.
Song et al., "Generative modeling by estimating gradients of the data distribution," Paper, Presented at the 33rd Conference on Neural Information Processing Systems, Vancouver, Canada, Dec. 8-14, 2019; Advances in Neural Information Processing Systems, Dec. 2019, 32:1-13.
Song et al., "Score-Based Generative Modeling through Stochastic Differential Equations," CoRR, Submitted on Nov. 26, 2020, arXiv:2011.13456v1, 32 pages.
Su et al., "Dual Diffusion Implicit Bridges for Image-to-Image Translation," Paper, Presented at Proceedings of the International Conference on Learning Representations, Kigali, Rwanda, May 1-5, 2023, 18 pages.
Talebi et al., "Global Image Denoising," IEEE Transactions on Image Processing, Dec. 2013, 23(2):755-768.
Talebi et al., "Nonlocal Image Editing," IEEE Transactions on Image Processing, Aug. 2014, 23(10):4460-4473.
Tu et al., "Max ViT: Multi-axis Vision Transformer," Paper, Presented at Proceedings of the European Conference on Computer Vision, Tel Aviv, Israel, Oct. 23-27, 2022; LNCS, 2022, 13684:459-479.
Tumanyan et al., "Plug-and-Play Diffusion Features for Text-Driven Image-to-Image Translation," CoRR, Submitted on Nov. 22, 2022, arXiv:2211.12572v1, 15 pages.
Wallace et al., "EDICT: Exact Diffusion Inversion via Coupled Transformations," CoRR, Submitted on Dec. 22, 2022, arXiv:2211.12446v2, 24 pages.
Wei et al., "ELITE: Encoding Visual Concepts into Textual Embeddings for Customized Text-to-Image Generation," CoRR, Submitted on Aug. 18, 2023, 16 pages.
Wu et al., "Tune-A-Video: One-Shot Tuning of Image Diffusion Models for Text-to-Video Generation," CoRR, Submitted on Dec. 22, 2022, arXiv:2212.11565v1, 16 pages.
Yang et al., "Diffusion Models: A Comprehensive Survey of Methods and Applications," ACM Computing Surveys, Feb. 2023, 56(4):1-51.
Yun et al., "Cutmix: Regularization strategy to train strong classifiers with localizable features," Paper, Presented at Proceedings of the IEEE/CVF Conference: Computer Vision and Pattern Recognition, Long Beach, CA, Jun. 15-20, 2019, pp. 6023-6032.
Zhang et al., "SINE: SINgle Image Editing with Text-to-Image Diffusion Models," CoRR, Submitted on Dec. 8, 2022, arXiv:2212.04489v1, 20 pages.
Zhang et al., "The Unreasonable Effectiveness of Deep Features as a Perceptual Metric," Paper, Presented at the IEEE/CVF Conference on Computer Vision and Pattern Recognition, Salt Lake City, UT, Jun. 18-23, 2018, pp. 586-595 (Author Manuscript).

* cited by examiner

FIG. 5A
Input Images
SYSTEM 10
DreamBooth
LoRA
Custom Diffusion
"photo of a [V] dog"
"a [V] dog in a swimming pool"
(b)
"a [V] sculpture made of glass"
"photo of a [V] sculpture"
(c)
"a [V] sculpture holding flowers"
"photo of a [V] plushy"
(d)
"a [V] plushy on a skateboard in times square"
"photo of a [V] building"
(e)
"a [V] building on Minecraft style"

FIG. 5B
w/ Cut-Mix-Unmix
w/o Cut-Mix-Unmix
Input Images
SYSTEM 10
Full
SYSTEM 10
Full
[$V_1$] plushy [$V_2$] plushy
(a) "photo of a [$V_1$] plushy sitting besides a [$V_2$] plushy"
[$V_1$] dog [$V_2$] cat
(b) "photo of a [$V_1$] dog sitting beside a [$V_2$] cat"
[$V_1$] dog [$V_2$] sculpture
(c) "photo of a [$V_1$] dog sitting beside a [$V_2$] sculpture"
[$V_1$] dog [$V_2$] sculpture
(d) "photo of a [$V_1$] dog sitting beside a [$V_2$] sculpture"
[$V_1$] dog
(e) "a [$V_1$] dog in front of a [$V_3$] building"
[$V_1$] sculpture
(f) "a [$V_2$] sculpture in front of a [$V_3$] building"
[$V_3$] building
(g) "a [$V_1$] dog sitting beside a [$V_2$] sculpture in front of a [$V_3$] building"

FINE-TUNING DIFFUSION-BASED GENERATIVE NEURAL NETWORKS USING SINGULAR VALUE DECOMPOSITIONS FOR TEXT-TO-IMAGE GENERATION

CROSS-REFERENCE TO RELATED APPLICATION

This application is a National Stage Application under 35 U.S.C. § 371 and claims the benefit of International Application No. PCT/US2024/019726, filed Mar. 13, 2024, which claims priority to U.S. Provisional Patent Application No. 63/453,030, filed on Mar. 17, 2023. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

Diffusion models, particularly, have achieved success in text-to-image generation, enabling the creation of high-quality images from text prompts, as well as other generative modalities. However, existing methods for customizing these models are limited when handling multiple personalized subjects and are at risk of overfitting and language-drifting. Moreover, their large number of parameters is inefficient for model storage.

In light of this, recent years have witnessed the rapid advancement of diffusion-based generative models for text-to-image generation, which have enabled the generation of high-quality, high-fidelity images through text prompts. Diffusion models can generate a wide range of objects, styles, and scenes with considerable realism and diversity. Such results have stimulated researchers to investigate ways to harness their abilities for image editing. For example, pre-trained diffusion models can be fine-tuned for adaption to specific tasks, individual user preferences, and customization. However, there are still many limitations associated with fine-tuning large-scale text-to-image diffusion models. One such limitation is the large parameter space, which can lead to overfitting and language-drifting from their original generalization ability. Another challenge is the difficulty in learning multiple personalized concepts, particularly when they are of similar categories.

SUMMARY

This specification describes a fine-tuning system implemented as computer programs on one or more computers in one or more locations that can fine-tune a diffusion-based generative neural network (DBGNN) that has been pre-trained for text-to-image generation.

In one aspect, a method performed by one or more computers for fine-tuning a diffusion-based generative neural network to obtain a fine-tuned version of the diffusion-based generative neural network is described, where the diffusion-based generative neural network has been pre-trained to process a text prompt describing a scene to generate an image depicting the scene.

The method includes: for each of a number of neural network layers of the diffusion-based generative neural network: obtaining an initial weight matrix including a number of pre-trained weights parametrizing the neural network layer: performing a singular value decomposition on the initial weight matrix to obtain: a number of singular values of the initial weight matrix, and for each singular value: (i) a respective left-singular vector of the initial weight matrix, and (ii) a corresponding right-singular vector of the initial weight matrix; shifting the singular values by respective spectral shifts to obtain a number of singular values of a new weight matrix: generating the new weight matrix from its singular values and the left-singular and right-singular vectors of the initial weight matrix, where the new weight matrix includes a number of new weights that depend on the spectral shifts; and re-parametrizing the neural network layer with the new weights that depend on the spectral sifts; and training the spectral shifts of each of the number of neural network layers of the diffusion-based generative neural network to obtain the fine-tuned version of the diffusion-based generative neural network.

As used herein, a "spectral shift" can be considered as a perturbation to a respective singular value.

In some implementations of the method, generating the new weight matrix from its singular values and the left-singular and right-singular vectors of the initial weight matrix includes summing each singular value of the new weight matrix multiplied with an outer product between the respective left-singular and right-singular vector of the initial weight matrix.

In some implementations of the method, training the spectral shifts of each of the number of neural network layers of the diffusion-based generative neural network to obtain the fine-tuned version of the diffusion-based generative neural network includes: obtaining a number of training examples that each include: (i) a respective input text prompt, and (ii) a corresponding target image: processing the respective input text prompt of each training example, using the diffusion-based generative neural network, to generate a respective output image that is an estimate of the corresponding target image: calculating gradients of an objective function with respect to the spectral shifts of each of the number of neural network layers of the diffusion-based generative neural network, where the objective function characterizes an error between the respective output and target images of each training example; and updating, using the gradients of the objective function, the spectral shifts of each of the number of neural network layers of the diffusion-based generative neural network to obtain the fine-tuned version of the diffusion-based generative neural network.

In some implementations of the method, the diffusion-based generative neural network was pre-trained using the objective function.

In some implementations of the method, the objective function includes a mean squared error function.

In some implementations of the method, the training examples include one or more prior-preservation training examples, and for each prior-preservation training example, the respective input text prompt was processed by the diffusion-based generative neural network, before the fine-tuning, to generate the corresponding target image.

In some implementations, the method further includes: receiving a new text prompt; and processing the new text prompt, using the fine-tuned version of the diffusion-based generative neural network, to generate a new image.

In some implementations of the method, the training examples include one or more single-subject training examples, and for each single-subject training example: (i) the respective input text prompt describes a subject, and (ii) the corresponding target image depicts the subject.

In some implementations, the method further includes: receiving a new text prompt describing the subject in a particular context; and processing the new text prompt, using the fine-tuned version of the diffusion-based generative neural network, to generate a new image depicting the subject in the particular context.

In some implementations of the method, the training examples include one or more multi-subject training examples, and for each multi-subject training example: (i) the respective input text prompt describes a number of subjects, and (ii) the corresponding target image includes, for each subject, a respective image depicting the subject.

In some implementations, the method further includes: receiving a new text prompt describing the number of subjects in a particular context; and processing the new text prompt, using the fine-tuned version of the diffusion-based generative neural network, to generate a new image depicting the number of subjects in the particular context.

In some implementations of the method, the training examples include a single-scene training example, and for the single-scene training example: (i) the respective input text prompt describes a particular scene, and (ii) the corresponding target image depicts the particular scene.

In some implementations, the method further includes: receiving a new text prompt describing the particular scene with one or more modifications; and processing the new text prompt, using the fine-tuned version of the diffusion-based generative neural network, to generate a new image depicting the particular scene with the one or more modifications.

In some implementations of the method, the pre-trained weights are pre-trained convolutional filter weights.

In some implementations of the method, obtaining the initial weight matrix includes: obtaining a fourth-order weight tensor including the pre-trained convolutional filter weights; and reshaping the fourth-order weight tensor to obtain the initial weight matrix.

In some implementations of the method, the diffusion-based generative neural network implements a latent diffusion model.

In some implementations, the method further includes: performing any of the abovementioned methods multiple times to obtain a number of fined-tuned versions of the diffusion-based generative neural network; and obtaining a final version of the diffusion-based generative neural network based on the number of fined-tuned versions of the diffusion-based generative neural network.

In some implementations of the method, obtaining the final version of the diffusion-based generative neural network based on the number of fine-tuned versions of the diffusion-based generative neural network includes, for each of the number of neural network layers of the diffusion-based generative neural network: obtaining, for each fine-tuned version of the diffusion-based generative neural network, a respective weight matrix including a number of fine-tuned weights parametrizing the neural network layer of the fine-tuned version of the diffusion-based generative neural network: linearly combining the weight matrices of each of the number of fine-tuned versions of the diffusion-based generative neural network to generative a final weight matrix including a number of final weights; and parameterizing the neural network layer of the final version of the diffusion-based generative neural network with the final weights.

In a second aspect, a system including one or more computers and one or more storage devices communicatively coupled to the one or more computers is described. The one or more storage devices store instructions that, when executed by the one or more computers, cause the one or more computers to perform operations of any of the abovementioned methods.

In a third aspect, a system including one or more non-transitory computer storage media is described. The one or more non-transitory computer storage media store instructions that, when executed by one or more computers, cause the one or more computers to perform operations of any of the abovementioned methods.

Particular embodiments of the subject matter described in this specification can be implemented so as to realize one or more of the following advantages.

The fine-tuning system described in the specification can fine-tune a diffusion-based generative neural network (DBGNN) on a compact. "spectral shift" parameter space to obtain a fine-tuned version of the DBGNN, e.g., to adapt the DBGNN to specific tasks or individual user preferences.

The fine-tuning system can address the limitations in existing text-to-image diffusion models and facilitate image customization. The fine-tuning system can fine-tune the singular values of weight matrices, leading to a compact and efficient parameter space that reduces the risk of overfitting and language-drifting. The fine-tuning system has a significantly smaller model size compared to existing methods, making it practical for real-world applications. Therefore, the fine-tuning system can be deployed on devices with limited computational resources, e.g., with limited memory and storage, such as mobile devices, laptops, tablets, and edge devices.

As one example application, the fine-tuning system can implement a "Cut-Mix-Unmix" data-augmentation technique to enhance the quality of multi-subject image generation. This technique, together with the spectral shift parameter space, enables a fine-tuned DBGNN to learn multiple personalized concepts even for semantically similar categories (e.g., a "cat" and a "dog"). As another example application, the fine-tuning system can implement a text-based image editing framework to provide a means of altering a particular scene depicted in a single image. This can provide robust user customization of images without overfitting to the single image.

The details of one or more embodiments of the subject matter of this specification are set forth in the accompanying drawings and the description below. Other features, aspects, and advantages of the subject matter will become apparent from the description, the drawings, and the claims.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

Like reference numbers and designations in the various drawings indicate like elements.

DETAILED DESCRIPTION

Figure 1A:
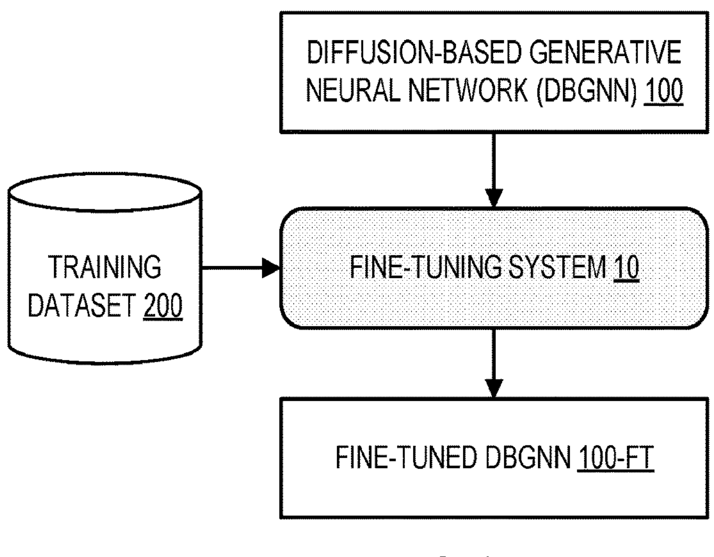
FIG. 1A is a block diagram of an example fine-tuning system that can fine-tune a diffusion-based generative neural network (DBGNN) to obtain a fine-tuned version of the DBGNN.

To overcome some or all of the abovementioned challenges related to fine-tuning diffusion models for text-to-image generation, this specification introduces a fine-tuning system that is highly efficient, effective, and utilizes a small computational and memory footprint.

Particularly, the fine-tuning system can fine-tune a diffusion model on a compact, yet efficient, parameter space, referred to herein as the "spectral shift" parameter space, which involves fine-tuning the singular values of weight matrices parametrizing the neural network layers of the diffusion model. Constraining the space of trainable parameters can lead to improved performance of the diffusion model on a target domain. Moreover, the spectral shifts utilize the full representation power of the weight matrix while being more compact than other methods for constraining parameter spaces, e.g., LoRA (Low-Rank Adaptation of Large Language Models). The compact parameter space of spectral shifts allows mitigation of overfitting and language-drifting issues in diffusion models, especially when prior-preservation loss is not applicable.

Example use cases of the fine-tuning system are described for implementing a single-image editing framework. To further enhance the ability of the diffusion model to learn multiple personalized concepts, the fine-tuning system can also implement a "Cut-Mix-Unmix" data-augmentation technique. This technique, together with the spectral shift parameter space, enables the diffusion model to learn multiple personalized concepts even for semantically similar categories (e.g., a "cat" and a "dog").

As an example of learning personalized concepts, a unique identifier may be associated with a particular subject instance of an object class. When the unique identifier is provided as part of a text prompt, e.g., as a particular token assigned to the particular subject instance, the model can generate a new image depicting the particular subject instance in a scene as described by the text prompt. Thus, it is possible to retrieve specific subject instances from the fine-tuned model. This may be carried out using only a few training images (e.g., 2-3 training images) of the subject instance for fine-tuning the model.

This disclosure opens avenues for efficient and effective fine-tuning of large-scale text-to-image diffusion models for personalization and customization, while having a small computational and memory footprint. A few of the notable contributions described in this disclosure include:

A compact, yet efficient, spectral shift parameter space for fine-tuning diffusion models based on singular value decompositions of weight kernels.

A text-based single-image editing framework and the demonstration of its use case with the spectral shift parameter space.

A Cut-Mix-Unmix method for data augmentation to enhance the ability of the diffusion model to learn multiple personalized concepts.

These and other features related to the systems and methods disclosed in this specification are described in more detail below:

FIG. 1A is a block diagram of an example fine-tuning system 10 configured to fine-tune a diffusion-based generative neural network (DBGNN) 100. The fine-tuning system 10 is an example of a system implemented as computer programs on one or more computers in one or more locations in which the systems, components, and techniques described below are implemented.

At a high-level, the fine-tuning system 10 is configured to fine-tune the DBGNN 100 on a training dataset 200 to obtain a fine-tuned version of the DBGNN 100-FT. In the described examples, the DBGNN 100 has been pre-trained for text-to-image generation. That is, the DBGNN 100 is configured to: receive, as input, a text prompt 112 describing a scene; and process the text prompt 112 to generate, as output, an image 132 depicting the scene.

Figure 2:
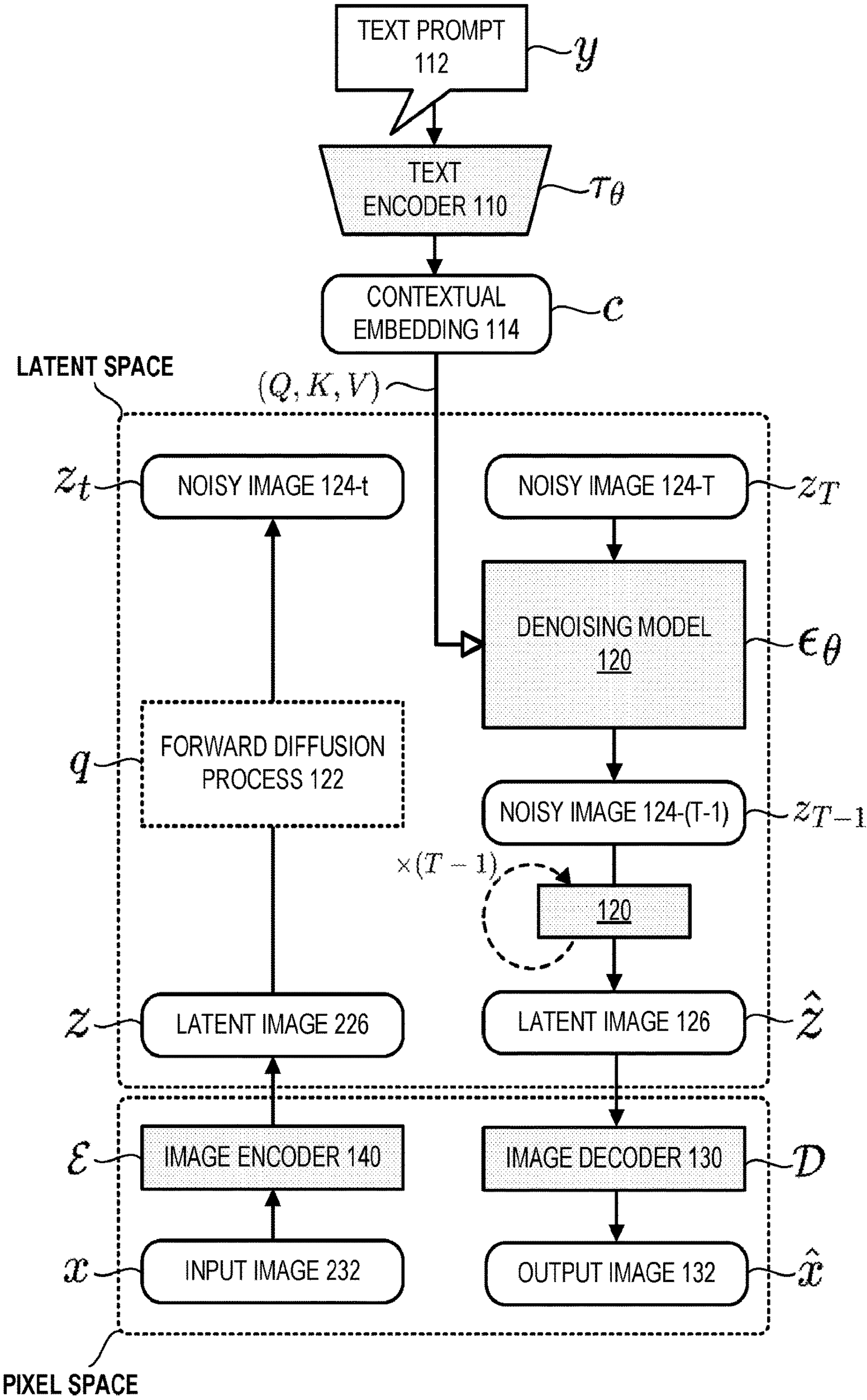
FIG. 2 is a schematic diagram of an example configuration of a DBGNN implementing a latent diffusion model.

The DBGNN 100 can have any appropriate neural network architecture that enables it to perform its described function, i.e., processing a text prompt 112 to generate an image 132. In particular, the DBGNN 100 can include any appropriate types of neural network layers (e.g., fully-connected layers, convolutional layers, recurrent layers, self-attention layers, etc.) in any appropriate numbers (e.g., 5 layers, 25 layers, or 100 layers) and connected in any appropriate configuration (e.g., as a linear sequence of layers, in residual configurations, in gated configurations, etc.). Moreover, the DBGNN 100 can implement any type of diffusion model, such as a sampling-acceleration enhancement type diffusion model, a likelihood-maximization enhancement type diffusion model, or a data-generalization enhancement type diffusion model. An example taxonomy of such diffusion models is provided by Yang, Ling, et al., "Diffusion Models: A Comprehensive Survey of Methods and Applications." ACM Computing Surveys 56.4 (2023): 1-39. For simplicity, the DBGNN 100 will be described herein as implementing a latent diffusion model, e.g., with a U-Net or Transformer architecture, a schematic diagram of which is shown in FIG. 2. This latent diffusion model is relatively proficient at high-resolution text-to-image generation. One example of such a latent diffusion model utilizing a U-Net architecture is described in Rombach. Robin, et al . . . "High-Resolution Image Synthesis with Latent Diffusion Models," *Proceedings of the IEEE CVF Conference on Computer Vision and Pattern Recognition* (2022). A brief overview of latent diffusion models is described below with reference to FIG. 2.

As used herein, the term "scene" generally refers to any collection of one or more objects (e.g., subjects), or generic "things" that may or may not be interacting in some way. For example, a scene may include multiple objects interacting with one another in an environment, e.g., a strawberry in a mug under the starry sky, or a brain riding a rocket ship towards the moon, or a strawberry mug filled with white sesame seeds floating in a dark chocolate sea. A scene may include a single object without a background or backdrop, or with a single-color background or backdrop, e.g., a minimal kinetic sculpture of a bird on a white background. A scene may include text or abstract art such as colors, shapes, lines, and so on, e.g., a blue flame forming text, or a watercolor-based painting.

Referring again to FIG. 1A, in general, the fine-tuning system 10 is presented with a DBGNN 100 that may perform text-to-image generation with some proficiency but can still be optimized and/or adapted. That is, the fine-tuning system 10 can fine-tune (or re-train) the DBGNN 100 such that the fine-tuned version of the DBGNN 100-FT has improved performance and/or new functionalities. For example, the fine-tuning system 10 can enhance the quality of both single-subject, multi-subject, and singe-scene image generation of the DBGNN 100, as well as enable other modalities such as style mixing and single-image editing.

The fine-tuning system 10 accomplishes this by fine-tuning the DBGNN 100 on a compact "spectral shift" parameter space using the training dataset 200. Further details are described below with reference to FIGS. 3A-4B. In general, the training dataset 200 includes multiple training examples 210 that each include: (i) a respective input text prompt 212, and (ii) a corresponding target image 232. The fine-tuning system 10 can fine-tune the DBGNN 100 on the spectral shift parameter space such that the fine-tuned DBGNN 100-FT learns to associate the input text prompt 212 with its target image 232, while still retaining most of the overall structure of the original, pre-trained DBGNN 100. Particularly, the fine-tuning system 10 can use various types of training examples 210 to promote certain features and functionality of the resultant fine-tuned DBGNN 100-FT.

Figure 1B:
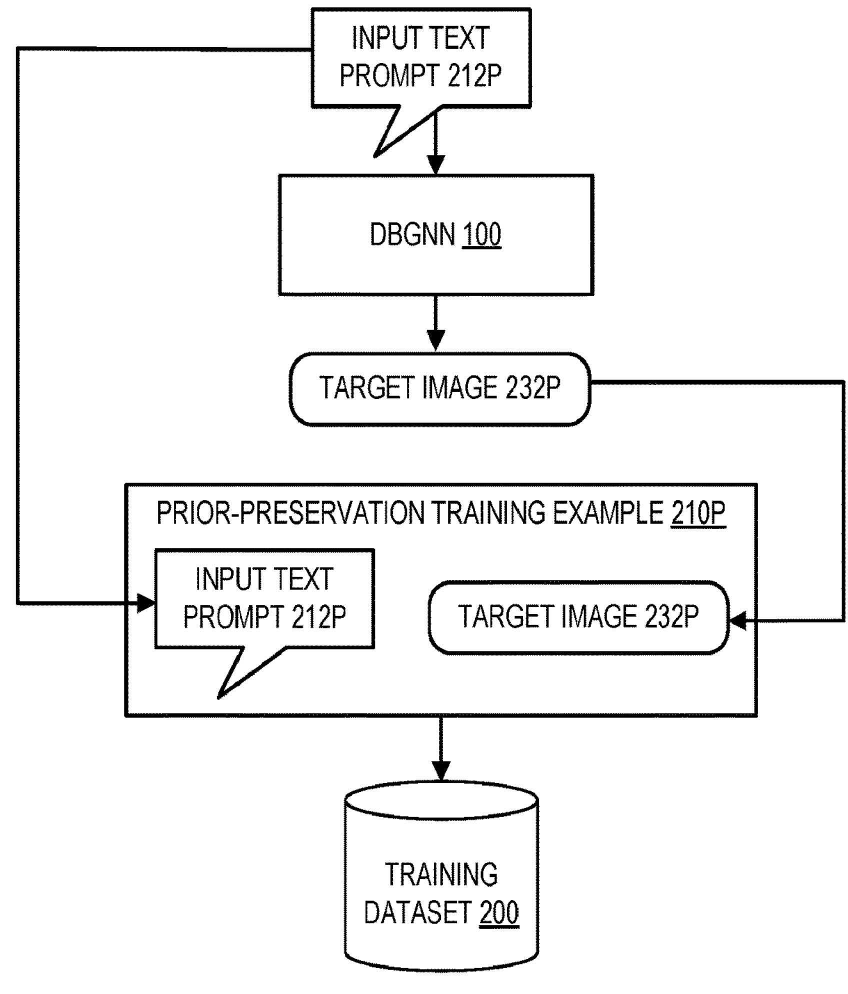
FIG. 1B is an example implementation of a fine-tuning system using one or more prior-preservation training examples for fine-tuning.

Referring to FIG. 1B, as one example, to preserve features of the pre-trained DBGNN 100, the training dataset 200 can include one or more prior-preservation training examples 210P. In this case, each input text prompt 212P of a prior-preservation training example 210P was processed by the DBGNN 100, before being fine-tuned, to generate the corresponding target image 232P. In addition to the spectral shift parameter space, the prior-preservation training example(s) 210P can help the fine-tuned DBGNN 100-FT retain features of the original DBGNN 100 and mitigate the risk of overfitting and language-drifting.

As another example, for single-subject manipulation, the training dataset 200 can include one or more single-subject training examples 210S. In this case, each input text prompt 212S of a single-subject training example 210S describes a single subject, and the corresponding target image 232S depicts the subject. Proceeding fine-tuning on the single-subject training example(s) 210S, the fine-tuned DBGNN 100-FT can then receive a new text prompt 112 describing the subject in a particular context, and process the new text prompt 112 to generate a new image 132 depicting the subject in the particular context.

Figures 1C, 1D:
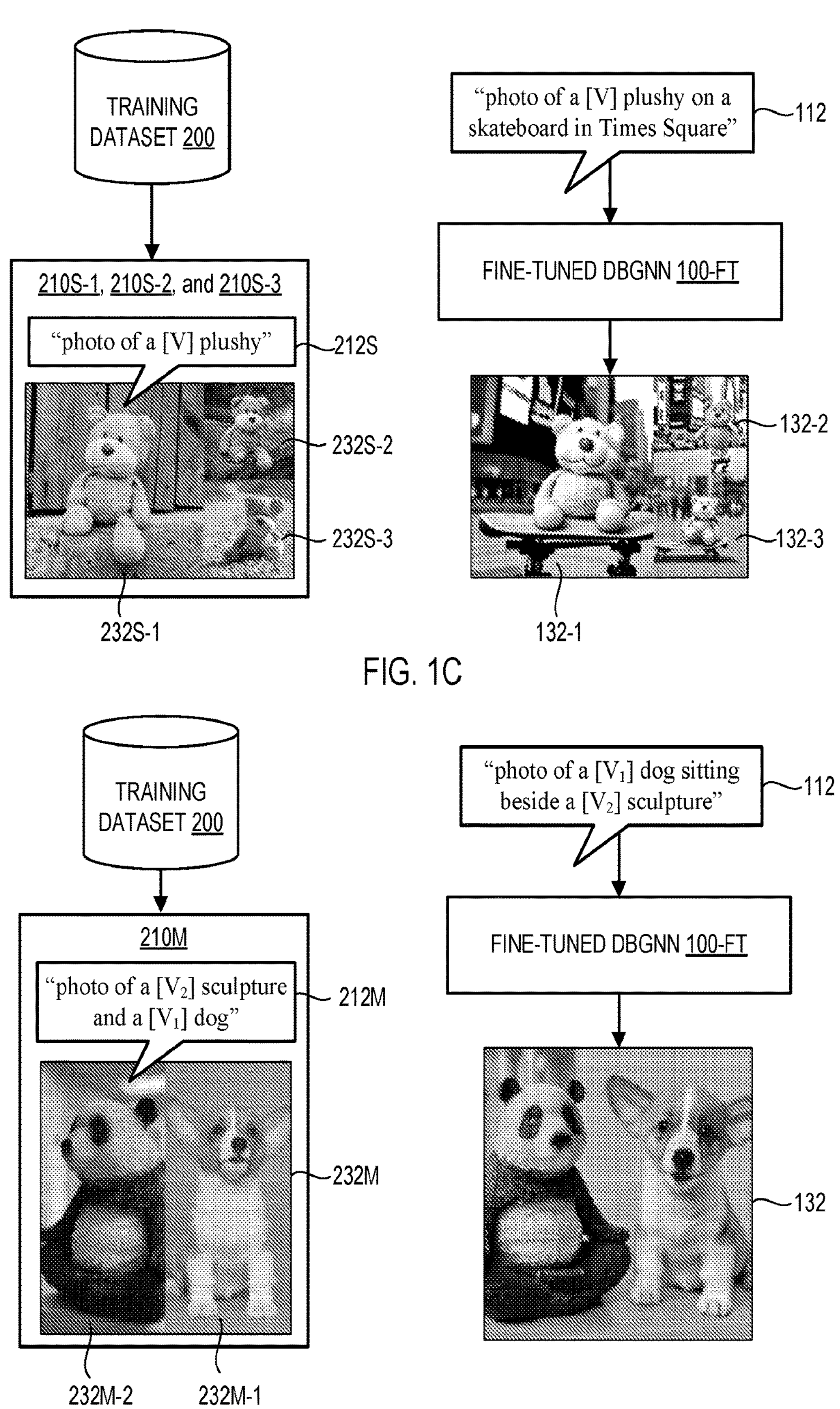
FIG. 1C is an example implementation of a fine-tuning system for performing single-subject manipulation.
FIG. 1D is an example implementation of a fine-tuning system for performing multi-subject manipulation.

FIG. 1C shows a block diagram of an example implementation of the fine-tuning system 10 for performing single-subject manipulation. Here, the training dataset 200 includes multiple (three) single-subject training examples 210S-1, 210S-2, and 210S-3. Each single-subject training example 210S includes: (i) an input text prompt 212S including "photo of a [V] plushy", and (ii) a target image 232S depicting a plushy bear. The "[V]" represents a particular token assigned to the subject, the plushy bear in this example, that the DBGNN 100 is trained to associate with the target images 232S-1, 232S-2, and 232S-3 depicting the subject. Proceeding fine-tuning on the single-subject training examples 210S, the fine-tuned DBGNN 100-FT can then receive a new text prompt 112 including "photo of a [V] plushy on a skateboard in times square". The fine-tuned DBGNN 100-FT can then process the new text prompt 112 to generate a new image 132 depicting the plushy bear on a skateboard in Times Square. Here, three new images 132-1, 132-2, and 132-3 depicting the plushy bear on a skateboard in Times Square are provided as examples. Each of which can be generated by the fine-tuned DBGNN 100-FT given the new text prompt 112.

As another example, for multi-subject manipulation, the training dataset 200 can include one or more multi-subject training examples 210M. In this case, each input text prompt 212M of a multi-subject training example 210M describes multiple subjects, and the corresponding target image 232M includes, for each subject, a respective image 232M-i depicting the subject. Proceeding fine-tuning on the multi-subject training example(s) 210M, the fine-tuned DBGNN 100-FT can then receive a new text prompt 112 describing the subjects in a particular context, and process the new text prompt 112 to generate a new image 132 depicting the subjects in the particular context.

FIG. 1D shows a block diagram of an example implementation of the fine-tuning system 10 for performing multi-subject manipulation, e.g., using a Cut-Mix-Unmix data augmentation technique. Here, the training dataset 200 includes a multi-subject training example 210M. The multi-subject training example 210M includes: (i) an input text prompt 212M including "photo of a [$V_2$] sculpture and a [$V_1$] dog", and (ii) a target image 232M that includes a first image 232M-1 depicting a corgi puppy, and a second image 232M-2 depicting a panda sculpture. The first 232M-1 and second 232M-2 images have been cropped and stitched together to obtain the target image 232M, e.g., either manually by a user or by an automated means. "[$V_1$]" and "[$V_2$]" represent the particular tokens assigned to each of the subjects, the corgi puppy and the panda sculpture respectively in this example, that the DBGNN 100 is trained to associate with the target image 232M depicting the subjects. Proceeding fine-tuning on the multi-subject training example 210M, the fine-tuned DBGNN 100-FT can then receive a new text prompt 112 including "photo of a [$V_1$] dog sitting beside a [$V_2$] sculpture". The fine-tuned DBGNN 100-FT can then process the new text prompt 112 to generate a new image 132 depicting the corgi puppy sitting beside the panda sculpture.

As yet another example, for single-image editing, the training dataset 200 can include a single-scene training example 210X. In this case, the input text prompt 212X of the single-scene training example 210X describes a particular scene, and the corresponding target image 232X depicts the particular scene. Proceeding fine-tuning on the single-scene training example 210X, the fine-tuned DBGNN 100-FT can then receive a new text prompt 112 describing the particular scene with one or more modifications, and process the new text prompt 112 to generate a new image 132 depicting the particular scene with the modification(s).

Figure 1E:
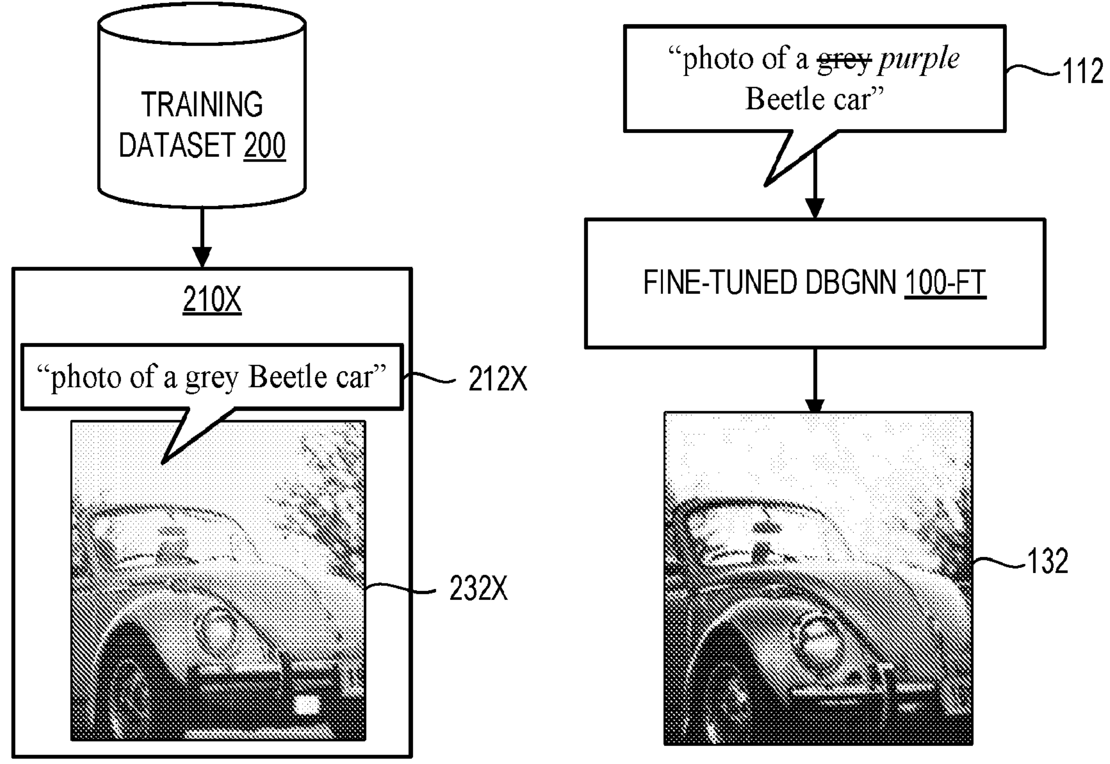
FIG. 1E is an example implementation of a fine-tuning system for performing single-image manipulation.

FIG. 1E shows a block diagram of an example implementation of the fine-tuning system 10 for performing single-image editing. Here, the training dataset 200 includes a single-scene training example 210X. The single-scene training examples 210X includes: (i) an input text prompt 212X including "photo of a grey Beetle car", and (ii) a target image 232X depicting the grey Beetle car. In this case, no particular token is learned by the DBGNN 100. Instead, the DBGNN 100 is trained to associate the target image 232X depicting the particular scene with the input text prompt 212X describing the particular scene. This allows the input text prompt 212X to be modified to incorporate different features into the particular scene. For example, proceeding fine-tuning on the single-scene training example 210X, the fine-tuned DBGNN 100-FT can then receive a new text prompt 112 including "photo of a grey purple Beetle car", where "grey purple" represents the modification(s) to the input text prompt 212. The fine-tuned DBGNN 100-FT can then process the new text prompt 112 to generate a new image 132 depicting the Beetle car with a purple color.

The fine-tuning system 10 can be implemented in any appropriate location, e.g., on a user device (e.g., a mobile device), or on one or more computers in a data center, etc. Users can interact with the fine-tuning system 10, e.g., by providing a (pre-trained) DBGNN 100 and a training dataset 200 to the fine-tuning system 10 by way of an interface, e.g., a graphical user interface, or an application programming interface (API). In particular, a user can provide an input that includes: (i) a request to fine-tune a DBGNN 100, and (ii) a query including the DBGNN 100 and a training dataset 200 the DBGNN 100 is to be fine-tuned on. In response to receiving the input, the fine-tuning system 10 can fine-tune the DBGNN 100 on the training dataset 200, responsive to the request, and provide a fine-tuned version of the DBGNN 100-FT to the user, e.g., for implementation on a user device of the user, or for storage in a data storage device. In some cases, the fine-tuning system 10 can transmit the fine-tuned DBGNN 100-FT to a user device of the user, e.g., by way of a data communication network (e.g., the internet).

FIG. 2 is a schematic diagram of an example configuration of a DBGNN 100 implementing a latent diffusion model. A brief review of latent diffusion models is provided below. Here, the DBGNN 100 includes a text encoder ($\tau_e$) 110, a denoising model ($\epsilon_e$) 120, an image decoder (D) 130, and an image encoder ($\varepsilon$) 140. In this case, the DBGNN 100 performs image generation in latent space using compressed, latent representations of images and converts the latent images to pixel space. Particularly, the DBGNN 100 generates latent representations 126 of images 132 while conditioned on contextual embeddings 114 of text prompts 112. The DBGNN 100 then decodes the latent representations 126 into the images 132. The particular operations of each module of the DBGNN 100 are summarized below.

The text encoder 110 is configured to: receive a text prompt (y) 112 describing a scene; and process the text prompt 112 to generate a context embedding (c) 114 of the text prompt 112. The operations of the text encoder 110 can be expressed as $c=\tau_e(y)$, where $\tau_\theta$ is a function representing the neural network model of the text encoder 110, parameterized by a subset of the DBGNN 100's network parameters ($\theta$).

The denoising model 120 is configured to: receive an input including the contextual embedding 114 and a noisy latent image ($Z_t$) 124-*t*; and process the input to generate an estimated latent representation ($\hat{z}$) 126 of an output image 132. The operations of the denoising model 120 can be expressed as $\hat{z}(z_t, c)=(z_t-\sigma_t\hat{\epsilon}_\theta(z_t, c))/\alpha_t$, where $\hat{\epsilon}_\theta$ is a function representing the neural network model of the denoising model 120, parameterized by a subset of the DBGNN 100's network parameters. Here, the denoising model 120 is conditioned on the context embedding 114 via a cross-attention mechanism. This is achieved by incorporating one or more cross-attention layers in the denoising model 120 that implement $\text{Attention}(Q, K, V)=\text{softmax}(QK^T/\sqrt{d})\cdot V$.

The image decoder 130 is configured to: receive an estimated latent representation 126 of an output image 132; and process the estimated latent image 126 to generate the output image ($\hat{z}$) 132, where the output image 132 depicts the scene described by the text prompt 112. The operations of the image decoder 130 can be expressed as $\hat{x}=\mathcal{D}(\hat{z})$, where $\mathcal{D}$ is a function representing the neural network model of the image decoder 130.

The image encoder 140 is configured to: receive an input image (x) 232 depicting a scene; and process the image 232 to generate a latent representation (z) 226 of the image 232. The operations of the image encoder 140 can be expressed as $z=\varepsilon(x)$, where $\varepsilon$ is a function representing the neural network model of the image encoder 140. Note, in this implementation, the image decoder 130 and the image encoder 140 are fixed (frozen) models.

In general, the latent diffusion model is described by a forward diffusion process (q) 122 that injects noise into a latent representation 226 of an input image 232. The forward diffusion process 122 is expressed in terms of linear Gaussians obeying a Markovian structure:

$$q(z_t|z)=\mathcal{N}\left(z_t;\alpha_t z,\sigma_2^2 I\right),\ q(z_t|z_s)=\mathcal{N}\left(z_t;(\alpha_t/\alpha_s)z_s,\sigma_{t|s}^2 I\right). \tag{1}$$

Here, $z_t$ is a noisy latent image 124-*t* at a discrete diffusion time step of $t=\{1, 2, \ldots, T\}$, and $$\sigma_{t|s}^2=[1-\exp(\lambda_t-\lambda_s)]\sigma_t^2$$

is the variance of the forward transition distribution $q(z_t|z_s)$. The hyperparameters of the latent diffusion model, $\alpha_t$ and $\sigma_t$-specify a noise schedule whose log signal-to-noise ratio $$\lambda_t=\log\left(\alpha_t^2/\sigma_t^2\right)$$

decreases monotonically with the diffusion time step t until the forward prior distribution $q(z_t|z)$ converges to a standard normal distribution $q(z_T|z)=q(z_T)=\mathcal{N}(z_T; 0,1)$ at a time step of t=T. Note, any noise schedule can be implemented by the DBGNN 100, such as linear, polynomial, or cosine noise scheduling, among others. The DBGNN 100 can also use any number of time steps when modeling the diffusion process 122—the total number of time steps (T) is a hyperparameter that, in general, places a bound on the training loss, e.g., with respect to the evidence lower bound (ELBO), with a larger number of time steps providing lower loss. The total number of time steps corresponds to the total of number of iterations the denoising model 120 performs to denoise a noisy latent image ($z_T$) 124-T starting from t=T into a final, estimated latent image ($\hat{z}(z_1, c)$) 126 ending at t=1.

Particularly, the DBGNN 100 learns the generative model by matching the forward diffusion process 122 in the reverse time direction, generating the noisy latent image ($z_t$) 124-*t* starting from t=T and ending at t=1. Learning the generative model can be reduced to learning to denoise a noisy latent image $z_t \sim q(z_t|z)$ into an estimated latent image $\hat{z}(z_t, c) \approx z$ for all t={1, 2, . . . , T}. After using the re-parametrization trick on the noisy latent image $z_t = \alpha_t z + \sigma_t \epsilon$, this learned denoising can be represented by an objective function $L_\theta(z, c)$ of the form:

$$L_\theta(z, c) = \mathbb{E}_{\epsilon,t}\left[\omega_t \|\epsilon_\theta(\alpha_t z + \sigma_t \epsilon, c) - \epsilon\|_2^2\right]. \tag{2}$$

Here, (z, c) are pairs of latent images 226 and contextual embeddings 114 with $\epsilon \sim \mathcal{N}(0, I)$ sampled from a standard normal distribution and t~U(1,T) sampled from a discrete uniform distribution over the timesteps, between values of 1 and T. $\omega_t$ is a weighting factor that influences the quality of estimates for particular values of t.

After learning a suitable parametrization θ, the DBGNN 100 can then generate latent images 126 from noisy latent images 124-*t* while conditioned on the contextual embeddings 114. To sample noisy latent images 124-*t* during the reverse process, the DBGNN 100 can use the discrete time ancestral sampler with sampling variances derived from lower and upper bounds on reverse process entropy. An example implementation of the ancestral sampler is provided by Jonathan Ho, Ajay Jain, and Pieter Abbeel, "Denoising Diffusion Probabilistic Models." NeurIPS. 2020. Alternatively, the DBGNN 100 can use the deterministic denoising diffusion implicit model (DDIM) sampler as described by Jiaming Song. Chenlin Meng, and Stefano Ermon, "Denoising diffusion implicit models," arXiv preprint arXiv: 2010.02502 (2020). The DDIM sampler is a numerical integration rule for the probability flow ordinary differential equation (ODE) which describes how a sample from a standard normal distribution can be deterministically transformed into a sample from the image data distribution using the denoising model 120.

Figure 3A:
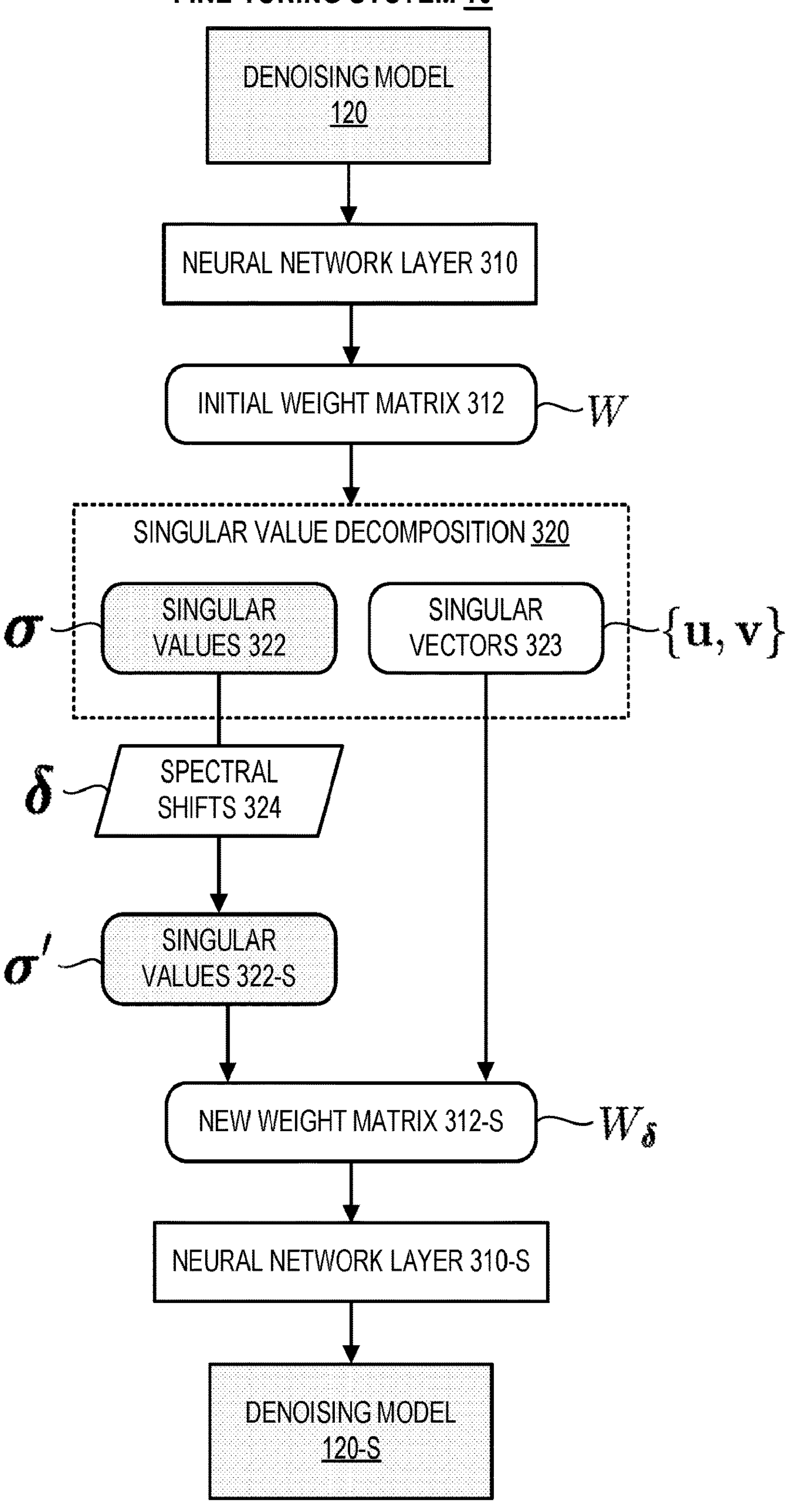
FIGS. 3A-3B are schematic diagrams showing processes performed by the fine-tuning system for fine-tuning a DBGNN implementing a latent diffusion model.
Figure 3B:
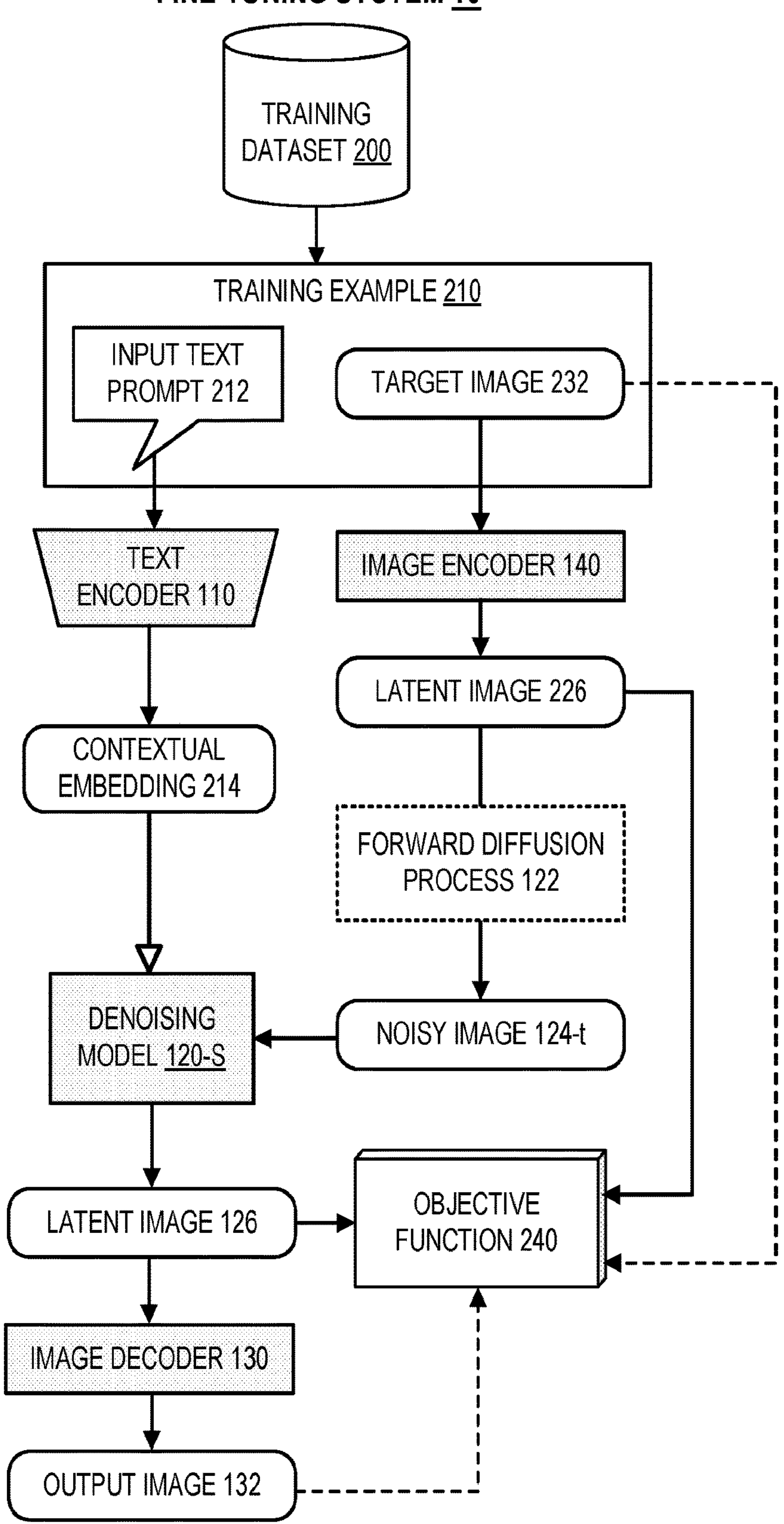

FIGS. 3A-3B are schematic diagrams showing processes performed by the fine-tuning system 10 for fine-tuning the DBGNN 100 on the training dataset 200 to obtain the fine-tuned version of the DBGNN 100-FT. Here, each of multiple neural network layers 310 of the DBGNN 100's denoising model 120 are fine-tuned in the spectral shift parameter space, while the text encoder 110 is left unaffected. However, in general, the fine-tuning system 10 can fine-tune some (e.g., 1, 2, 3, 4, 5, 10, 15, 20, 25, 50 or more) or all the neural network layers 310 of the DBGNN 100, including the neural network layers 310 of the text encoder 110. Note, this may depend on the type of neural network layers 310 utilized by each module of the DBGNN 100, e.g., feed-forward layers, convolutional layers, recurrent layers, attention layers, etc. As one example, if the denoising model 120 utilizes a U-Net architecture or other convolutional-based architecture, the fine-tuning system 10 can fine-tune all the convolutional layers of the denoising model 120. As another example, if the denoising model 120 utilizes a Transformer architecture or other attention-based architecture, the fine-tuning system 10 can fine-tune all the attention layers of the denoising model 120. Such Transformer architectures include, but are not limited to, diffusion Transformers (or "DiTs"), vision Transformers (or "ViTs"), and ViT-based U-Net architectures (or "U-ViTs"). An example of a DiT is described in Peebles, William, and Saining Xie. "Scalable Diffusion models with Transformers." *Proceedings of the IEEE CVF International Conference on Computer Vision* (2023). An example of a U-ViT is described in Bao, Fan, et al., "All are Worth Words: A ViT Backbone for Diffusion Models." *Proceedings of the IEEE CVF Conference on Computer Vision and Pattern Recognition* (2023).

Referring to FIG. 3A, the fine-tuning system 10 obtains an initial weight matrix (W) 312 that includes a set of pre-trained weights parameterizing a neural network layer 310 of the denoising model 120. In other words, the initial weight matrix 312 includes the pre-trained weights as entries where the size of the initial weight matrix 312 corresponds to the total size of the parameter space of the neural network layer 310. For example, fully-connected weights correspond to a two-dimensional parameter space that can be directly represented by the initial weight matrix 312, i.e., as a second-order weight tensor. On the other hand, convolutional filter weights correspond to a four-dimensional parameter space that can be directly represented by a fourth-order weight tensor. In this case, the fine-tuning system 10 can reshape the fourth-order weight tensor into the initial weight matrix 312 (i.e., a second-order weight tensor). Broadly, the set of weights of a particular neural network layer 310 determines how the neural network layer 310 transforms data. For example, each weight can specify how a particular node of the neural network layer 310 transforms an element of an input vector into an element of an output vector that is thereafter processed by a subsequent neural network layer 310, e.g., after being modified by an activation function.

The fine-tuning system 10 then performs a singular value decomposition (SVD) 320 on the initial weight matrix 312 to obtain the singular values (θ) 322 of the initial weight matrix 312, as well as the singular vectors {u, v} 323 of the initial weight matrix 312. For each singular value ($\sigma_i$) 322, the singular vectors 323 of the initial weight matrix 312 include: (i) a respective left-singular vector ($u_i$), and (ii) a corresponding right-singular vector ($v_i$). Consequently, the initial weight matrix 312 can then be represented in terms of $W = U\Sigma V^T$, where 2=diag(σ) is a diagonal matrix including the singular values $\sigma = [\sigma_1, \sigma_2, \ldots]$ along the diagonal in descending order. The semi-unitary matrix $U = [u_1, u_2, \ldots]$ includes the respective left-singular vectors as columns, and the other semi-unitary matrix $V = [v_1, v_2, \ldots]$ includes the corresponding right-singular vectors as columns. Note, the SVD 320 is a one-time computation that can be cached by the fine-tuning system 10. The fine-tuning system 10 can use various algorithms for computing the SVD 320 and obtaining the singular values 322 and vectors 323 of the initial weight matrix 312. Such algorithms include, but are not limited to, the one-sided Jacobi algorithm, the two-sided Jacobi algorithm, a numerical algorithm, or other appropriate algorithm.

Following the SVD 320, the fine-tuning system 10 shifts each of the singular values 322 by respective spectral shifts (δ) 324 to obtain the singular values ($\sigma' = \mathrm{ReLU}(\sigma + \delta)$) 322-S of a new weight matrix 312-S($W_\delta$). Here, ReLU denotes the Rectified Linear Unit function that is defined as the positive part of its argument. This ensures the singular values 322-S of the new weight matrix 312-S are not less than zero. Consequently, the spectral shifts 324 can be understood as perturbations, that is, the difference between the singular values 322-S of the new weight matrix 312-S and the singular values 322 of the initial weight matrix 312.

The fine-tuning system 10 then generates the new weight matrix 312-S from its singular values 322-S and the singular vectors 323 of the initial weight matrix 312 as:

$$W_\delta = U \sum_\delta V^T = \sum_i \sigma'_i u_i \otimes v_i, \tag{3}$$

where $\Sigma_\delta = \text{diag}(\sigma')$ and $\otimes$ represents the outer product. The multiplication of the matrices U, $\Sigma_\delta$, and V, amounts to a summation of each singular value 322-S of the new weight matrix 312-S multiplied with an outer product between the respective left-singular and right-singular vector of the initial weight matrix 312. Hence, the new weight matrix 312-S includes a set of new weights, as entries, that depend on the spectral shifts 324. The fine-tuning system 10 then re-parameterizes the neural network layer 310-S with the new weights. Since the new weight matrix 312-S shares the same singular vectors 323 as the initial weight matrix 312-S, the overall structure of the re-parameterized neural network layer 310-S is retained but can be fine-tuned from the original parameterization of the neural network layer 310 along its eigendirections. Geometrically, the semi-unitary matrices U and V can be understood as rotations in the parameter space of the neural network layer 310, and $\Sigma$ can be understood as a scaling along each of the directions in this parameter space. Thus, perturbing the singular values 322 with the spectral shifts 324 amounts to changing the scaling. The spectral shifts 324 present a highly compact parameter space for fine-tuning, as opposed to modifying all the weights independently. Optimization of the spectral shifts 324 leverages the fact that the singular vectors 323 correspond to the closed-form solutions of the eigenvalue problem:

$$\max_n \|Wn\|_2^2$$

subject to the constraint that $\|n\|=1$.

The fine-tuning system 10 can perform this procedure for any desired number of neural network layers 310 of the DBGNN 100 to obtain a set of neural network layers 310-S that are each re-parameterized by a respective set of spectral shifts 324, which in this case re-parameterizes ($\theta_\delta$) the denoising model ($\epsilon_{\theta_\delta}$) 120-S in terms of the spectral shifts 324. Subsequently, the fine-tuning system 10 trains the spectral shifts 324 of each of the re-parameterized neural network layers 310-S to obtain the fine-tuned DBGNN 100-FT. Example implementations of the fine-tuning system 10 for training the spectral shifts 324 of a DBGNN 100 implementing a latent diffusion model are described below with reference to FIG. 3B.

Referring to FIG. 3B, the fine-tuning system 10 obtains a training dataset 200 that includes multiple training examples 210. Each training example 210 includes: (i) a respective input text prompt 212, and (ii) a corresponding target image 232. As described above, the training dataset 200 can include one or more prior-preservation training examples 210P, one or more single-subject training examples 210S, one or more multi-subject training examples 210M, and/or a single-scene training example 210X.

Here, the fine-tuning system 10 trains the re-parameterized denoising model 120-S to generate a respective output image 132 that estimates the respective target image 232 of each training example 210, while conditioned on a contextual embedding 214 of the corresponding input text prompt 212.

In more detail, for each training example 210, the fine-tuning system 10 processes the input text prompt ($y^*$) 212 of the training example 210, using the text encoder ($\tau_\theta$) 110, to generate a contextual embedding ($c^*$) 214 of the input text prompt 212. The fine-tuning system 10 then conditions the re-parameterized denoising model ($\hat{\epsilon}_{\theta_\epsilon}$) 120-S on the contextual embedding 214, e.g., using a cross-attention mechanism as described above. The fine-tuning system 10 then processes the target image ($x^*$) 232 of the training example 210, using the image encoder ($\varepsilon$) 140, to generate a latent representation ($z^*$) 226 of the target image 232. The fine-tuning system 10 then injects noise ($\epsilon$) into the latent image 226, using the forward diffusion process 122, to obtain a noisy latent image ($z_t = \alpha_t z^* + \sigma_t \epsilon$) 124-$t$. The fine-tuning system 10 then processes the noisy latent image 124-$t$, using the re-parameterized denoising model 120-S while conditioned on the contextual embedding 214, to generate an estimated latent representation ($\hat{z}_{\theta_\delta}$) 126 of the output image 132.

The fine-tuning system 10 then optimizes an objective function ($\mathcal{L}$) 240 that includes a loss function ($\mathcal{L}_0$). The loss function depends on the respective latent images 226 and estimated latent images 126 of each training example 210. This diffusion-based loss function is a mean squared error function when averaged over all the training examples 210, the injected noise ($\epsilon$), and the number of diffusion time steps (t):

$$\mathcal{L}(\delta) = \mathcal{L}_0(\delta) = \mathbb{E}_{z^*, c^*, \epsilon, t}\left[\omega_t \left\|\hat{\epsilon}_{\theta_\delta}(\alpha_t z^* + \sigma_t \epsilon, c^*) - \epsilon\right\|_2^2\right], \tag{4}$$

where ($z^*$, $c^*$) represents the training examples 210 the denoising model 120-S is being adapted to. In some implementations, the fine-tuning system 10 incorporates a weighted prior-preservation loss function ($\mathcal{L}_{pr}$) into the objective function $\mathcal{L} = \mathcal{L}_0 + \lambda \mathcal{L}_{pr}$ to separately account for any prior-preservation training examples ($z^{pr}$, $c^{pr}$) 210P. Here, the prior-preservation loss function is also a diffusion-based loss function:

$$\mathcal{L}_{pr}(\delta) = \mathbb{E}_{z^{pr}, c^{pr}, \epsilon, t}\left[\omega_t \left\|\hat{\epsilon}_{\theta_\delta}(\alpha_t z^{pr} + \sigma_t \epsilon, c^{pr}) - \epsilon\right\|_2^2\right], \tag{5}$$

where $\lambda$ is a hyperparameter that controls the influence of the prior-preservation training examples 210P. In the case of single-image editing, where the prior-preservation loss cannot be utilized, the fine-tuning system 10 sets the hyperparameter to $\lambda = 0$.

In general, the objective function 240 characterizes an error between the respective target 232 and output 132 images of each training example 210. For a latent diffusion model, this error is typically measured in latent space, directly between values of the latent representations of the target 232 and output 132 images. However, this error can also be measured in pixel space, directly between pixel values of the target 232 and output 132 images. For example, the fine-tuning system 10 can process the estimated latent image 126 of each training example 210, using the image decoder 130, to generate the output image 132 that is an estimate of the target image 232 for the training example 210. Alternatively, or in addition, the fine-tuning system 10 can then incorporate a loss function, e.g., a diffusion-based loss function, into the objective function 240 that directly measures the error between pixel values of the target 232 and output 132 images.

To optimize the objective function 240, the fine-tuning system 10 determines values of the spectral shifts 324 that minimize the associated loss terms included in the objective function 240, e.g., those in Eqs. (4) and (5). For example, when implementing a stochastic gradient descent method, e.g., Implicit updates, Momentum, AdaGrad, RMSProp, Adam, etc., the fine-tuning system 10 can use backpropagation to determine gradients of the objection function 240 with respect to the spectral shifts 324 of each neural network layer 310. The fine-tuning system 10 can then apply an appropriate update rule, e.g., with a particular learning rate and/or weight decay, to update the spectral shifts 324 using the gradients of the objection function 240.

The fine-tuning system 10 can repeat these abovementioned processes multiple times to obtain multiple fine-tuned versions of the DBGNN 100-FT. For example, the fine-tuning system 10 can use different training examples 210 and/or different objective functions 240 for each of the fine-tuned DBGNNs 100-FT such that each fine-tuned version of the DBGNN 100-FT has different functionality, different modalities, and/or other different properties. The fine-tuning system 10 can also generate a final version of the DBGNN 100 based on the multiple different fine-tuned DBGNNs 100-FT. Particularly, individually trained spectral shifts 324 of each of the multiple fine-tuned DBGNNs 100-FT can be linearly combined into the new, final version of the DBGNN 100, e.g., in order to create novel renderings. Since the weight matrices 312 of each of the fine-tuned DBGNNs 100-FT share the same singular vectors 323, they can be linearly combined into a final weight matrix ($W_{\delta'}$) that includes linearly combinations of the spectral shifts 324 of each:

$$W_{\delta'} = U \sum_{\delta'} V^T, \tag{6}$$

where σ' denotes a linear combination of trained spectral shifts 324 from each fine-tuned DBGNN 100-FT. This can enable applications including interpolation, style mixing, and/or multi-subject generation. Two strategies for linear combination are addition and interpolation. For example, to perform addition between two fine-tuned DBGNNs 100-FT, the fine-tuning system 10 can add their corresponding spectral shifts 324, $\delta_1$ and $\delta_2$, as:

$$\sum_{\delta'} = \text{diag}(ReLU(\sigma + \delta_1 + \delta_2)). \tag{7}$$

For interpolation between two fine-tuned DBGNNs 100-FT, with $0 \le \alpha \le 1$.

$$\sum_{\delta'} = \text{diag}(ReLU(\sigma + \alpha\delta_1 + (1-\alpha)\delta_2)). \tag{8}$$

This allows the fine-tuning system 10 to smoothly transition between two fine-tuned DBGNNs 100-FT, as well as to interpolate between different image styles.

Figure 4A:
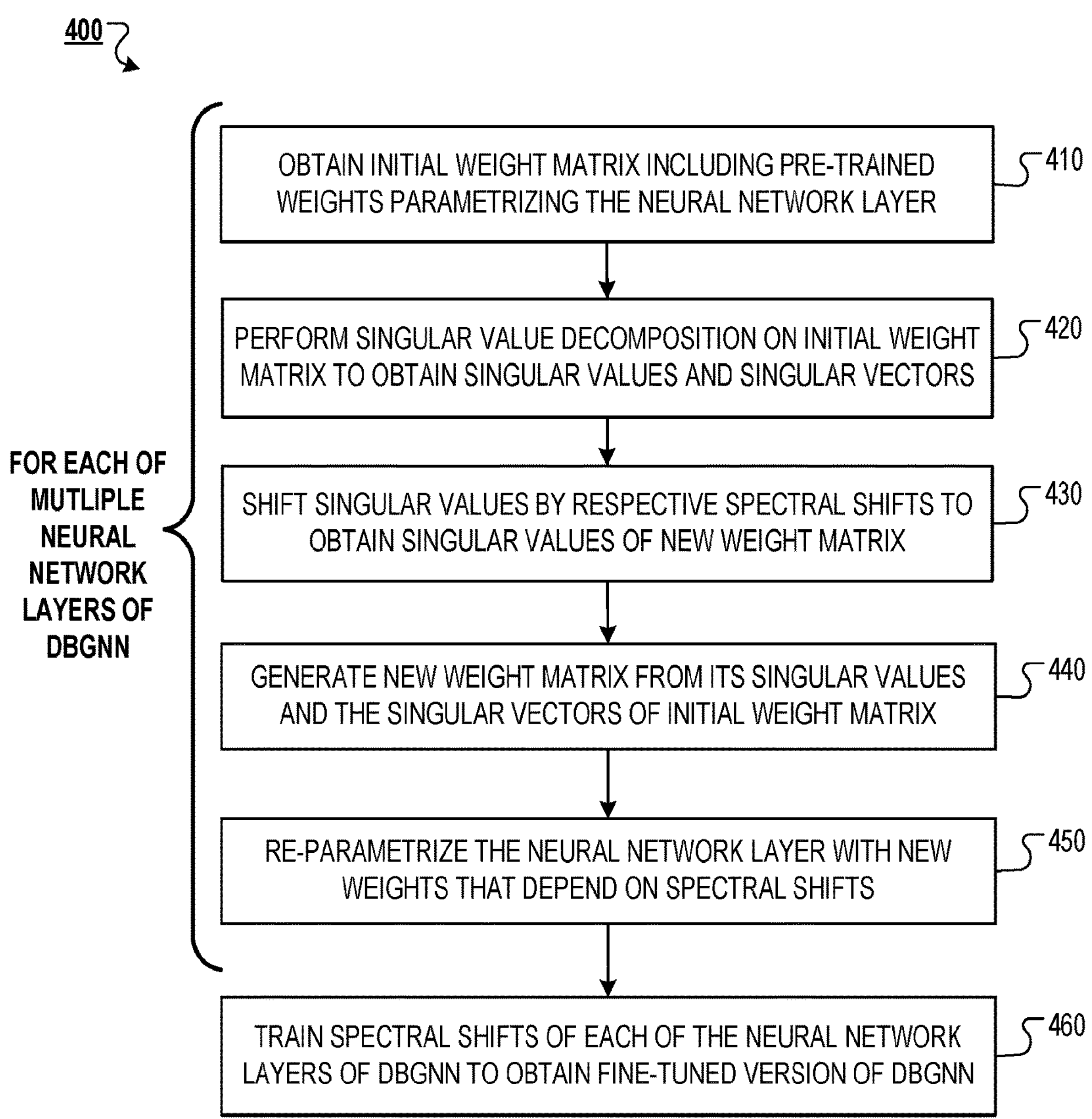
FIG. 4A is a flow chart of an example process for fine-tuning a DBGNN to obtain a fine-tuned version of the DBGNN.

FIG. 4A is a flow chart of an example process 400 for fine-tuning a DBGNN to obtain a fine-tuned version of the DBGNN. For example, the process 400 can enable the fine-tuned DBGNN to generate images depicting a particular subject instance of an object class and/or perform image editing. For convenience, the process 400 will be described as being performed by a system of one or more computers located in one or more locations. For example, a fine-tuning system, e.g., the fine-tuning system 10 of FIGS. 1A, 3A, and 3B, appropriately programmed in accordance with this specification, can perform the process 400.

For each of multiple neural network layers of the DBGNN, the fine-tuning system performs the following steps (410) to (450):

The fine-tuning system obtains an initial weight matrix including a set of pre-trained weights parametrizing the neural network layer (410).

In some implementations, the pre-trained weights are pre-trained convolutional filter weights. In these cases, the fine-tuning system can first obtain a fourth-order weight tensor including the pre-trained convolutional filter weights. The fine-tuning system can then reshape the fourth-order weight tensor to obtain the initial weight matrix.

The fine-tuning system performs a singular value decomposition on the initial weight matrix to obtain: the singular values of the initial weight matrix, and for each singular value: (i) a respective left-singular vector of the initial weight matrix, and (ii) a corresponding right-singular vector of the initial weight matrix (420).

The fine-tuning system shifts the singular values by respective spectral shifts to obtain the singular values of a new weight matrix (430).

The fine-tuning system generates the new weight matrix from its singular values and the left-singular and right-singular vectors of the initial weight matrix (440). The new weight matrix includes a set of new weights that depend on the spectral shifts.

For example, to generate the new weight matrix, the fine-tuning system can sum each singular value of the new weight matrix multiplied with an outer product between the respective left-singular and right-singular vector of the initial weight matrix.

The fine-tuning system re-parametrizes the neural network layer with the new weights that depend on the spectral sifts (450).

The fine-tuning system trains the spectral shifts of each of the neural network layers of the DBGNN to obtain the fine-tuned version of the DBGNN (460).

Figure 4B:
FIG. 4B is a flow diagram of an example process for training spectral shifts of each of multiple neural network layers of a DBGNN.
Figure 4B:
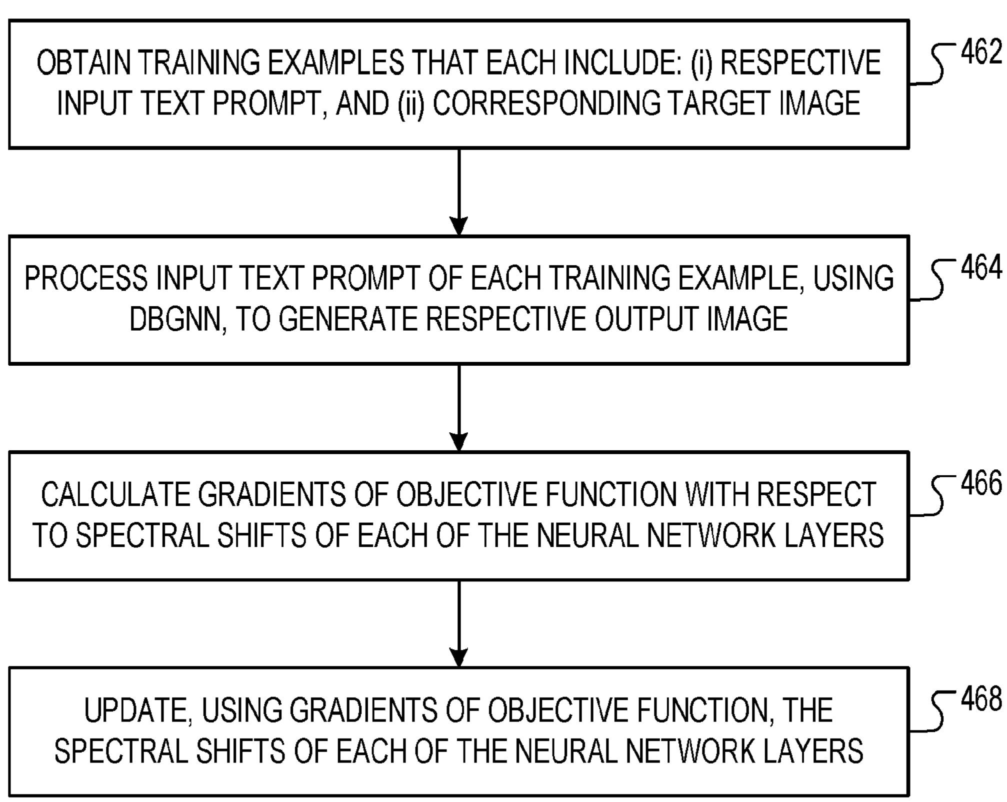

FIG. 4B is a flow diagram of an example process 460 for training the spectral shifts of each of the neural network layers of the DBGNN. For convenience, the process 460 will be described as being performed by a system of one or more computers located in one or more locations. For example, a fine-tuning system, e.g., the fine-tuning system 10 of FIGS. 1A, 3A, and 3B, appropriately programmed in accordance with this specification, can perform the process 460.

The fine-tuning system obtains multiple training examples that each include: (i) a respective input text prompt, and (ii) a corresponding target image (462).

The fine-tuning system processes the respective input text prompt of each training example, using the DBGNN, to generate a respective output image that is an estimate of the corresponding target image (464).

The fine-tuning system calculates gradients of an objective function with respect to the spectral shifts of each of the neural network layers of the DBGNN (466). The objective function characterizes an error between the respective output and target images of each training example.

For example, the objective function can include a mean squared error function characterizing a squared error loss between the respective output and target images of each training example, e.g., in latent space, pixel space, or both.

The fine-tuning system updates, using the gradients of the objective function, the spectral shifts of each of the neural network layers of the DBGNN to obtain the fine-tuned version of the DBGNN (468).

Figure 5A:
FIG. 5A shows additional example implementations of a fine-tuning system for performing single-subject manipulation.

FIG. 5A shows additional example implementations of the fine-tuning system 10 for performing single-subject manipulation.

Here, experimental results of the fine-tuning system 10 for customized single-subject manipulation are presented which involved fine-tuning a pre-trained text-to-image DBGNN 100. The DBGNN 100 was fine-tuned on a single object or concept using 3-5 training images of the single object or concept. These results are compared against DreamBooth, LoRA, and Custom Diffusion for fine-tuning, which are shown along each row of input images (a, b, c, d, and e). All baselines were trained for 500 or 1000 steps with a batch size of 1 (except for Custom Diffusion, which used a default batch size of 2), and the best model was selected for fair comparison. As shown in FIG. 5A, the fine-tuning system 10 produced similar results to DreamBooth which fine-tunes all the weights of the model, despite having a significantly smaller parameter space. Custom Diffusion, on the other hand, tends to underfit the training images as shown in rows 2, 3, and 5 of FIG. 5A.

Figure 5B:
FIG. 5B shows additional example implementations of a fine-tuning system for performing multi-subject manipulation.

FIG. 5B shows additional example implementations of the fine-tuning system 10 for performing multi-subject manipulation.

For multi-subject manipulation, the fine-tuning system 10 can use a Cut-Mix-Unmix technique as described above. This is particularly helpful to aid a DBGNN 100 to learn to differentiate between subject instances of similar object classes. Here, the fine-tuning system 10 constructs and presents the model with "correctly" cut-and-mixed image samples, e.g., as shown in FIG. 1D. The fine-tuning system 10 then instructs the DBGNN 100 to unmix the combined samples. In this method, the fine-tuning system 10 creates stitched target images and corresponding input text prompts, e.g., "photo of a [$V_1$] dog on the left and a [$V_2$] sculpture on the right" or "photo of a [$V_2$] sculpture and a [$V_1$] dog", as illustrated in FIG. 1D. The fine-tuning system 10 can generate prior-preservation training examples in a similar manner. During fine-tuning of the DBGNN 100, the fine-tuning system 10 applies the Cut-Mix-Unmix data augmentation with a pre-defined probability (e.g., set to 0.6). This probability is typically not set to 1, as doing so would make it challenging for the DBGNN 100 to differentiate between subjects. During inference, a different text prompt can be processed by the fine-tuned DBGNN 100 from the one used during fine-tuning, such as "a [$V_1$] dog sitting beside a [$V_2$] sculpture".

However, if the fine-tuned DBGNN 100-FT overfits to the Cut-Mix-Unmix training examples, it may generate samples with stitching artifacts even with a different text prompt 112. To alleviate this problem, the fine-tuning system 10 can extend the Cut-Mix technique to incorporate an "unmix" regularization on the cross-attention maps. To enforce separation between two subjects, the fine-tuning system 10 can use a mean squared error loss on the non-corresponding regions of the cross-attention maps. For example, this loss encourages the dog's particular token ([$V_1$]) to focus (attention) solely on the dog and vice versa for the panda's particular token ([$V_2$]). The results of this extension show a significant reduction in stitching artifacts.

Experimental results of the fine-tuning system 10 for multi-subject generation are depicted in FIG. 5B, which illustrate the advantage of the "Cut-Mix-Unmix" data augmentation technique. When enabled, the fine-tuning system 10 performs Cut-Mix-Unmix data-augmentation with a probability of about 0.6 in each data sampling iteration and two subjects were randomly selected without replacement. A comparison between using "Cut-Mix-Unmix" (marked as "w/Cut-Mix-Unmix") and not using it (marked as "w/o Cut-Mix-Unmix", performing augmentation with a probability of 0) are shown in FIG. 5B. Each row of output images was generated using the same text prompt after fine-tuning, which are displayed below the images. Note that the Cut-Mix-Unmix data augmentation technique is generic and can be applied to fine-tuning full weights as well as spectral shifts. Rows ($\alpha$-d) show the results of fine-tuning on two subjects and rows (e-g) show the results of fine-tuning on three subjects. Both full weight ("Full") and spectral shift ("SVD") fine-tuning can benefit from the Cut-Mix-Unmix data augmentation. Without Cut-Mix-Unmix, the models struggle to disentangle subjects of similar categories, as demonstrated in the last two columns of ($\alpha$, b, c, d, and g).

Figure 5C:
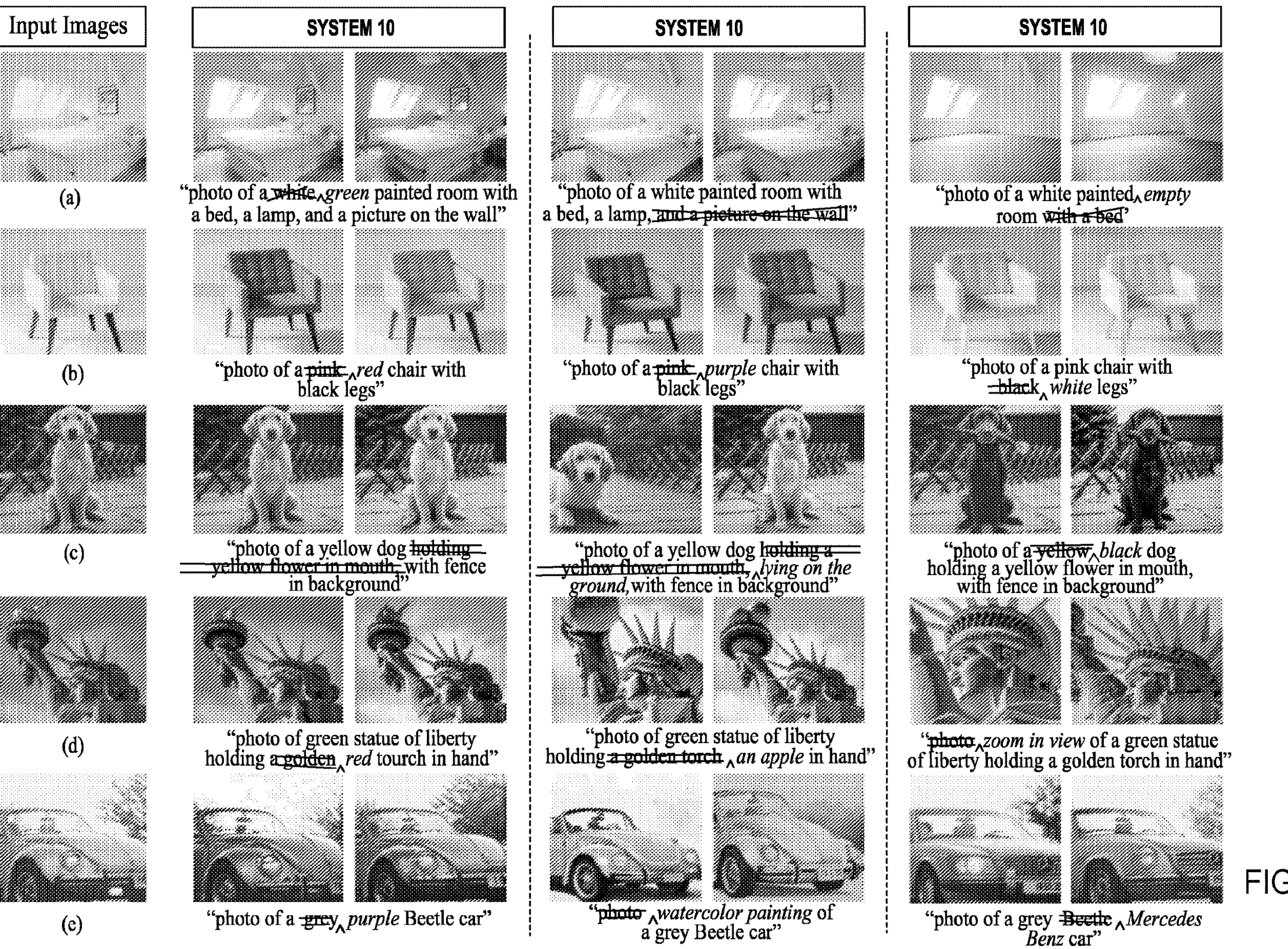
FIG. 5C shows additional example implementations of a fine-tuning system for performing single-image manipulation.

FIG. 5C shows additional example implementations of the fine-tuning system 10 for performing single-image manipulation.

The fine-tuning system 10 can enable singe-image editing by fine-tuning a DBGNN 100 with a single training example (or image-prompt pair), see FIG. 1E for example. The desired edits can be obtained at inference time by modifying the text prompt. As an example, the fine-tuning system 10 can fine-tune the DBGNN 100 with a single training example including: (i) an input text prompt of "photo of a crown with a blue diamond and a golden eagle on it", and (ii) a target image depicting a crown with a blue diamond and a golden eagle on it. At inference time, to remove the eagle, the fine-tuned DBGNN 100-FT can be queried with a new text prompt of "photo of a crown with a blue diamond on it".

Experimental results of the fine-tuning system 10 for single-image manipulation are depicted in FIG. 5C. As shown in FIG. 5C, each row (a, b, c, d, and e) presents three edits with fine-tuning of both spectral shifts ("SVD") and full weights ("Full"). The text prompts for the corresponding edited images are displayed below the images. The aim of this experiment was to demonstrate that regularizing the parameter space with spectral shifts effectively mitigates the language-drift issue, that is, the issue when a model overfits to a single image and loses its ability to generalize and perform desired edits.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for fine-tuning a diffusion-based generative neural network to obtain a fine-tuned version of the diffusion-based generative neural network, wherein the diffusion-based generative neural network has been pre-trained to process a text prompt describing a scene to generate an image depicting the scene, the method comprising:

for each of a plurality of neural network layers of the diffusion-based generative neural network:

obtaining an initial weight matrix comprising a plurality of pre-trained weights parametrizing the neural network layer;

performing a singular value decomposition on the initial weight matrix to obtain:

a plurality of singular values of the initial weight matrix, and for each singular value: (i) a respective left-singular vector of the initial weight matrix, and (ii) a corresponding right-singular vector of the initial weight matrix;

shifting the singular values by respective spectral shifts to obtain a plurality of singular values of a new weight matrix;

generating the new weight matrix from its singular values and the left-singular and right-singular vectors of the initial weight matrix, wherein the new weight matrix comprises a plurality of new weights that depend on the spectral shifts; and re-parametrizing the neural network layer with the new weights that depend on the spectral sifts; and training the spectral shifts of each of the plurality of neural network layers of the diffusion-based generative neural network to obtain the fine-tuned version of the diffusion-based generative neural network.

2. The method of claim 1, wherein generating the new weight matrix from its singular values and the left-singular and right-singular vectors of the initial weight matrix comprises:

summing each singular value of the new weight matrix multiplied with an outer product between the respective left-singular and right-singular vector of the initial weight matrix.

3. The method of claim 1, wherein training the spectral shifts of each of the plurality of neural network layers of the diffusion-based generative neural network to obtain the fine-tuned version of the diffusion-based generative neural network comprises:

obtaining a plurality of training examples that each include: (i) a respective input text prompt, and (ii) a corresponding target image;

processing the respective input text prompt of each training example, using the diffusion-based generative neural network, to generate a respective output image that is an estimate of the corresponding target image;

calculating gradients of an objective function with respect to the spectral shifts of each of the plurality of neural network layers of the diffusion-based generative neural network, wherein the objective function characterizes an error between the respective output and target images of each training example; and updating, using the gradients of the objective function, the spectral shifts of each of the plurality of neural network layers of the diffusion-based generative neural network to obtain the fine-tuned version of the diffusion-based generative neural network.

4. The method of claim 3, wherein the diffusion-based generative neural network was pre-trained using the objective function.

5. The method of claim 3, wherein the objective function comprises a mean squared error function.

6. The method of claim 3, wherein:

the training examples include one or more prior-preservation training examples, and for each prior-preservation training example, the respective input text prompt was processed by the diffusion-based generative neural network, before the fine-tuning, to generate the corresponding target image.

7. The method of claim 3, wherein:

the training examples include one or more single-subject training examples, and for each single-subject training example: (i) the respective input text prompt describes a subject, and (ii) the corresponding target image depicts the subject.

8. The method of claim 7, further comprising:

receiving a new text prompt describing the subject in a particular context; and processing the new text prompt, using the fine-tuned version of the diffusion-based generative neural network, to generate a new image depicting the subject in the particular context.

9. The method of claim 3, wherein:

the training examples include one or more multi-subject training examples, and for each multi-subject training example: (i) the respective input text prompt describes a plurality of subjects, and (ii) the corresponding target image includes, for each subject, a respective image depicting the subject.

10. The method of claim 9, further comprising:

receiving a new text prompt describing the plurality of subjects in a particular context; and processing the new text prompt, using the fine-tuned version of the diffusion-based generative neural network, to generate a new image depicting the plurality of subjects in the particular context.

11. The method of claim 3, wherein:

the training examples include a single-scene training example, and for the single-scene training example: (i) the respective input text prompt describes a particular scene, and (ii) the corresponding target image depicts the particular scene.

12. The method of claim 11, further comprising:

receiving a new text prompt describing the particular scene with one or more modifications; and processing the new text prompt, using the fine-tuned version of the diffusion-based generative neural network, to generate a new image depicting the particular scene with the one or more modifications.

13. The method of claim 1, further comprising:

receiving a new text prompt; and processing the new text prompt, using the fine-tuned version of the diffusion-based generative neural network, to generate a new image.

14. The method of claim 1, wherein the pre-trained weights are pre-trained convolutional filter weights.

15. The method of claim 14, wherein obtaining the initial weight matrix comprises:

obtaining a fourth-order weight tensor comprising the pre-trained convolutional filter weights; and reshaping the fourth-order weight tensor to obtain the initial weight matrix.

16. The method of claim 1, wherein the diffusion-based generative neural network implements a latent diffusion model.

17. The method of claim 1, further comprising:

performing the method of any preceding-claim 1 multiple times to obtain a plurality of fined-tuned versions of the diffusion-based generative neural network; and obtaining a final version of the diffusion-based generative neural network based on the plurality of fined-tuned versions of the diffusion-based generative neural network.

18. The method of claim 17, wherein obtaining the final version of the diffusion-based generative neural network based on the plurality of fine-tuned versions of the diffusion-based generative neural network comprises, for each of the plurality of neural network layers of the diffusion-based generative neural network:

obtaining, for each fine-tuned version of the diffusion-based generative neural network, a respective weight matrix comprising a plurality of fine-tuned weights parametrizing the neural network layer of the fine-tuned version of the diffusion-based generative neural network;

linearly combining the weight matrices of each of the plurality of fine-tuned versions of the diffusion-based generative neural network to generative a final weight matrix comprising a plurality of final weights; and parameterizing the neural network layer of the final version of the diffusion-based generative neural network with the final weights.

19. A system, comprising:

one or more computers; and one or more storage devices communicatively coupled to the one or more computers, wherein the one or more storage devices store instructions that, when executed by the one or more computers, cause the one or more computers to perform a method for fine-tuning a diffusion-based generative neural network to obtain a fine-tuned version of the diffusion-based generative neural network, wherein the diffusion-based generative neural network has been pre-trained to process a text prompt describing a scene to generate an image depicting the scene, the method comprising:

for each of a plurality of neural network layers of the diffusion-based generative neural network:

obtaining an initial weight matrix comprising a plurality of pre-trained weights parametrizing the neural network layer;

performing a singular value decomposition on the initial weight matrix to obtain:

a plurality of singular values of the initial weight matrix, and for each singular value: (i) a respective left-singular vector of the initial weight matrix, and (ii) a corresponding right-singular vector of the initial weight matrix;

shifting the singular values by respective spectral shifts to obtain a plurality of singular values of a new weight matrix;

generating the new weight matrix from its singular values and the left-singular and right-singular vectors of the initial weight matrix, wherein the new weight matrix comprises a plurality of new weights that depend on the spectral shifts; and re-parametrizing the neural network layer with the new weights that depend on the spectral sifts; and training the spectral shifts of each of the plurality of neural network layers of the diffusion-based generative neural network to obtain the fine-tuned version of the diffusion-based generative neural network.

20. One or more non-transitory computer storage media storing instructions that, when executed by one or more computers, cause the one or more computers to perform a method for fine-tuning a diffusion-based generative neural network to obtain a fine-tuned version of the diffusion-based generative neural network, wherein the diffusion-based generative neural network has been pre-trained to process a text prompt describing a scene to generate an image depicting the scene, the method comprising:

for each of a plurality of neural network layers of the diffusion-based generative neural network:

obtaining an initial weight matrix comprising a plurality of pre-trained weights parametrizing the neural network layer;

performing a singular value decomposition on the initial weight matrix to obtain:

a plurality of singular values of the initial weight matrix, and for each singular value: (i) a respective left-singular vector of the initial weight matrix, and (ii) a corresponding right-singular vector of the initial weight matrix;

shifting the singular values by respective spectral shifts to obtain a plurality of singular values of a new weight matrix;

generating the new weight matrix from its singular values and the left-singular and right-singular vectors of the initial weight matrix, wherein the new weight matrix comprises a plurality of new weights that depend on the spectral shifts; and re-parametrizing the neural network layer with the new weights that depend on the spectral sifts; and training the spectral shifts of each of the plurality of neural network layers of the diffusion-based generative neural network to obtain the fine-tuned version of the diffusion-based generative neural network.

* * * * *